US012761867B2

(12) United States Patent
Han

(10) Patent No.: US 12,761,867 B2
(45) Date of Patent: Oct. 13, 2026

(54) PLAY RECORD DISPLAY METHOD AND RELATED DEVICE

(71) Applicant: Petal Cloud Technology Co., Ltd., Dongguan (CN)

(72) Inventor: Weizheng Han, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 236 days.

(21) Appl. No.: 18/833,495

(22) PCT Filed: Jan. 5, 2023

(86) PCT No.: PCT/CN2023/070658
§ 371 (c)(1),
(2) Date: Jul. 26, 2024

(87) PCT Pub. No.: WO2023/142941
PCT Pub. Date: Aug. 3, 2023

(65) Prior Publication Data

US 2025/0173119 A1 May 29, 2025

(30) Foreign Application Priority Data

Jan. 26, 2022 (CN) ......................... 202210098185.9

(51) Int. Cl.
*G06F 3/16* (2006.01)
*G06F 16/638* (2019.01)
*G06F 16/64* (2019.01)

(52) U.S. Cl.
CPC ............ *G06F 3/165* (2013.01); *G06F 16/639* (2019.01); *G06F 16/64* (2019.01)

(58) Field of Classification Search
None
See application file for complete search history.

(56) References Cited

U.S. PATENT DOCUMENTS 7,548,934 B1 6/2009 Platt et al.
2009/0083362 A1* 3/2009 Svendsen ........... H04N 7/17336 709/224
2009/0287763 A1* 11/2009 Svendsen ................ H04L 51/52 709/203

(Continued)

FOREIGN PATENT DOCUMENTS

CN 111628916 A 9/2020
CN 112040276 A 12/2020

(Continued)

*Primary Examiner* — Toan H Vu
(74) *Attorney, Agent, or Firm* — Conley Rose, P.C.

(57) ABSTRACT

An IoT device and a personal device of a user are bound to a same account. After receiving a request of playing multi-media data from the user, the IoT device may obtain, from a server, a multimedia data resource that the user requests to play. The server may determine whether a distance between the personal device and the IoT device is less than or equal to a preset distance threshold. If the distance between the personal device and the IoT device is less than or equal to the preset distance threshold, the server calculates, based on a pre-stored historical play data record of the bound account, a preference degree of the user for the multimedia data that the user requests to play.

20 Claims, 23 Drawing Sheets

Electronic device 100

(56) References Cited

U.S. PATENT DOCUMENTS

| | | | | |
|---|---|---|---|---|
| 2010/0058377 | A1* | 3/2010 | Grob | H04N 21/8456 455/556.1 |
| 2011/0238779 | A1* | 9/2011 | Little | H04L 67/535 709/217 |
| 2012/0072996 | A1* | 3/2012 | Svendsen | H04L 51/10 726/28 |
| 2014/0075308 | A1* | 3/2014 | Sanders | G06F 3/0482 715/716 |
| 2014/0122593 | A1* | 5/2014 | Bachman | H04L 67/06 709/204 |
| 2014/0280181 | A1* | 9/2014 | Rodger | G06F 16/4387 707/740 |
| 2015/0356080 | A1 | 12/2015 | Brown et al. | |
| 2016/0259497 | A1* | 9/2016 | Foss | G06F 3/0482 |
| 2018/0276404 | A1* | 9/2018 | Dotan-Cohen | G06F 21/6245 |
| 2020/0004495 | A1* | 1/2020 | Dundar | G06F 3/165 |
| 2022/0223294 | A1* | 7/2022 | Baba | G16H 40/40 |
| 2023/0021336 | A1* | 1/2023 | Troxler | G06N 3/04 |

FOREIGN PATENT DOCUMENTS

| | | | |
|---|---|---|---|
| EP | 2993909 | A1 | 3/2016 |
| EP | 3896985 | A1 | 10/2021 |

* cited by examiner

Electronic device 100

PLAY RECORD DISPLAY METHOD AND RELATED DEVICE

CROSS-REFERENCE TO RELATED APPLICATIONS

This is a U.S. National Stage of International Patent Application No. PCT/CN2023/070658 filed on Jan. 5, 2023, which claims priority to Chinese Patent application Ser. No. 20/221,0098185.9 filed on Jan. 26, 2022. Both of the aforementioned patent applications are hereby incorporated by reference in their entireties.

TECHNICAL FIELD

This application relates to the field of terminal technologies, and in particular, to a play record display method and a related device.

BACKGROUND

With development of internet of things (Internet of Things, IoT) technologies, an increasing quantity of smart home devices (which are also referred to as IoT devices) such as smart speakers and smart televisions come into use in households. These IoT devices may support user voice operations, and have multimedia data play (for example, music data play and video data play) and other functions.

In a smart home scenario, smart home devices such as a smart speaker and a smart television may be usually used by a plurality of family members. Music play is used as an example. If a user requests a smart home device to play music, a music server cannot distinguish whether the request is initiated by a user of a personal device (for example, a mobile phone) or another family member of the user, and therefore cannot distinguish whether play data is generated by the user of the personal device or the another family member of the user. Further, accuracy of subsequent content recommendation to the user of the personal device based on a historical play data record of the user may be reduced, and user experience is poor.

SUMMARY

Embodiments of this application provide a play record display method and a related device, which may accurately identify whether play data of an IoT device is generated by a user of a personal device or generated by another family member of the user, so that accuracy of content recommendation to the user of the personal device based on a historical play record of the user is improved, and user experience is improved.

According to a first aspect, an embodiment of this application provides a play record display method, applied to a first electronic device, where both the first electronic device and a second electronic device are associated with a first account. The method includes: The first electronic device displays a first historical play record, where the first historical play record is a historical play record of the first account, and the first historical play record does not include a first song. The first electronic device receives a first message sent by a server. The first electronic device displays a second historical play record based on the first message, where the second historical play record includes the first song, and the first song is a song played by the second electronic device when a distance between the first electronic device and the second electronic device is less than or equal to a first preset threshold.

In this embodiment of this application, through implementation of the method according to the first aspect, when the distance between the first electronic device (for example, a mobile phone) and the second electronic device (for example, a smart speaker) is less than or equal to the first preset threshold, and both the first electronic device and the second electronic device are associated with a same account, it may be considered that a song played on the second electronic device is a song that a user of the first electronic device indicates the second electronic device to play. Further, the first electronic device may also display, in the historical play record, the song displayed on the second electronic device, to improve user experience.

In a possible implementation, the method further includes: The first electronic device displays a third historical play record, where the third historical play record does not include a second song, and the second song is the song played by the second electronic device when the distance between the first electronic device and the second electronic device is greater than the first preset threshold.

In this way, when the distance between the first electronic device and the second electronic device is greater than the first preset threshold, it may be determined that the second song is not the song that the user of the first electronic device indicates the second electronic device to play. Further, the second song does not need to be displayed in the third historical play record, and effect of content recommendation to the user of the first electronic device based on the third historical play record is not affected.

In a possible implementation, that the distance between the first electronic device and the second electronic device is less than or equal to the first preset threshold is obtained when the server determines that an IP address of the first electronic device is the same as an IP address of the second electronic device.

In this way, whether the IP address of the first electronic device is the same as the IP address of the second electronic device is determined to determine whether the distance between the first electronic device and the second electronic device is less than or equal to the first preset threshold.

In a possible implementation, that the distance between the first electronic device and the second electronic device is less than or equal to the first preset threshold is obtained when the server determines that first location information is the same as first reference location information, where the first location information is location information that is of the first electronic device and that is periodically sent by the first electronic device to the server, and the first reference location information is location information that is of the first electronic device and that is sent by the first electronic device to the server when the second electronic device is associated with the first account.

In this way, whether the location information of the first electronic device is the same as the location information of the first electronic device when the second electronic device is associated with the first account (that is, when a binding relationship is established between the first electronic device and the second electronic device) may be determined to determine whether the distance between the first electronic device and the second electronic device is less than or equal to the first preset threshold.

In a possible implementation, before the first electronic device receives a first message sent by a server, the method further includes: The first electronic device detects, based on a short-range communication connection, that one or more electronic devices associated with the first account exist in a same network, and obtains device information of the one or more electronic devices, where the device information of the one or more electronic devices includes device information of the second electronic device.

In this way, the first electronic device may obtain, through the short-range communication connection, the one or more electronic devices that exist in the same network and that are associated with the first account. If the device information of the one or more electronic devices includes the device information of the second electronic device, it may be considered that the distance between the first electronic device and the second electronic device is less than or equal to the first preset threshold.

In a possible implementation, an average difference between the first song and a song in the first historical play record is less than or equal to a second preset threshold.

In this way, that the average difference between the first song and the song in the first historical play record is less than or equal to the second preset threshold may be determined to further determine that the song played on the second electronic device is the song that the user of the first electronic device indicates the second electronic device to play.

In a possible implementation, a method for calculating the average difference between the first song and the song in the first historical play record is as follows:

$$Dist = \frac{\sqrt{\sum_{i=1}^{N} D_i^2}}{N}$$

$D_i$ is a difference between the first song and an $i^{th}$ song in the first historical record, and N is a quantity of songs in the first historical play record.

In a possible implementation, the server stores song category information. A method for calculating $D_i$ is as follows.

When the server determines, based on the song category information, that a category of the first song is the same as a category of the $i^{th}$ song in the first historical play record, $D_i$ is obtained through calculation by using the following formula:

$$D_i = \sqrt{(x_1 - x_0)^2 + (y_1 - y_0)^2 + (z_1 - z_0)^2}$$

$D_i$ is the difference between the first song and the $i^{th}$ song in the first historical record, N is the quantity of songs in the first historical play record, $x_1$, $y_1$, and $z_1$ are respectively a rhythm value of the first song, an age value of the first song, and a sadness/joy degree value of the first song, and $x_0$, $y_0$, and $z_0$ are respectively a rhythm value of the $i^{th}$ song in the first historical record, an age value of the $i^{th}$ song, and a sadness/joy degree value of the $i^{th}$ song.

When the server determines, based on the song category information, that the category of the first song is different from the category of the $i^{th}$ song in the first historical play record, $D_i$ is a preset fixed value.

In a possible implementation, the first message includes information about the first song.

In this way, the first electronic device may display the first song in the historical play record based on the information about the first song.

In a possible implementation, after the first electronic device displays a second historical play record, the method further includes: The first electronic device displays a song recommendation list, where the song recommendation list includes one or more songs of a same category as the first song.

In this way, when it is determined that the song played by the second electronic device is the song that the user of the first electronic device indicates the second electronic device to play, the song played by the second electronic device may be used as a data source for content recommendation to the user of the first electronic device.

In a possible implementation, before the first electronic device receives a first message sent by a server, the method further includes: The first electronic device detects an operation that the user binds the second electronic device. In response to the operation, the first electronic device obtains the device information of the second electronic device, and sends the first account, device information of the first electronic device, and the device information of the second electronic device to the server.

In this way, the server may be enabled to store an association relationship between the first account and each of the device information of the first electronic device and the device information of the second electronic device.

In a possible implementation, after the first electronic device detects an operation that the user binds the second electronic device, the method further includes: When the first electronic device enables location service permission, the first electronic device sends the location information of the first electronic device to the server.

In this way, the server may be enabled to store the location information of the first electronic device when the binding relationship is established between first electronic device and the second electronic device, and use the location information as reference location information for subsequently determining whether the distance between the first electronic device and the second electronic device is less than or equal to the first preset threshold.

According to a second aspect, an embodiment of this application provides a play record display method, applied to a communication system. The communication system includes a first electronic device, a second electronic device, and a server. Both the first electronic device and the second electronic device are associated with a first account. The method includes: The first electronic device displays a first historical play record, where the first historical play record is a historical play record of the first account, and the first historical play record does not include a first song. The second electronic device plays the first song. The second electronic device sends a second message to the server, where the second message includes information about the first song. The first electronic device receives a first message sent by the server. The first electronic device displays a second historical play record based on the first message, where the second historical play record includes the first song, and the first song is the song played by the second electronic device when a distance between the first electronic device and the second electronic device is less than or equal to a first preset threshold.

In a possible implementation, the method further includes: The second electronic device plays a second song. The second electronic device sends a third message to the server, where the third message includes information about the second song. The first electronic device displays a third historical play record, where the third historical play record does not include the second song, and the second song is the song played when the distance between the first electronic device and the second electronic device is greater than the first preset threshold.

In a possible implementation, before the first electronic device receives a first message sent by the server, the method further includes: The server determines whether an IP address of the first electronic device is the same as an IP address of the second electronic device. If the IP address of the first electronic device is the same IP address of the second electronic device, the server determines that the distance between the first electronic device and the second electronic device is less than or equal to the first preset threshold.

In a possible implementation, before the first electronic device receives a first message sent by the server, the method further includes: The server determines whether first location information is the same as first reference location information. If the first location information is the same as the first reference location information, the server determines that the distance between the first electronic device and the second electronic device is less than or equal to the first preset threshold, where the first location information is location information that is of the first electronic device and that is periodically sent by the first electronic device to the server, and the first reference location information is location information that is of the first electronic device and that is sent by the first electronic device to the server when the second electronic device is associated with the first account.

In a possible implementation, before the first electronic device receives a first message sent by the server, the method further includes: The first electronic device detects, based on a short-range communication connection, that one or more electronic devices associated with the first account exist in a same network, and obtains device information of the one or more electronic devices. The first electronic device sends a fourth message to the server, where the fourth message includes the device information of the one or more electronic devices. The server determines, based on the fourth message, that the distance between the first electronic device and the second electronic device is less than or equal to the first preset threshold, where the fourth message includes device information of the second electronic device.

In a possible implementation, before the first electronic device receives a first message sent by the server, the method further includes: The second electronic device detects, based on the short-range communication connection, that one or more electronic devices associated with the first account exist in a same network, and obtains device information of the one or more electronic devices. The second electronic device sends a fifth message to the server, where the fifth message includes the device information of the one or more electronic devices. The server determines, based on the fifth message, that the distance between the first electronic device and the second electronic device is less than or equal to the first preset threshold, where the fifth message includes device information of the first electronic device.

In a possible implementation, an average difference between the first song and a song in the first historical play record is less than or equal to a second preset threshold.

In a possible implementation, a method for calculating the average difference between the first song and the song in the first historical play record is as follows:

$$Dist = \frac{\sqrt{\sum_{i=1}^{N} D_i^2}}{N}$$

$D_i$ is a difference between the first song and an $i^{th}$ song in the first historical record, and N is a quantity of songs in the first historical play record.

In a possible implementation, the server stores song category information. A method for calculating $D_i$ is as follows.

When the server determines, based on the song category information, that a category of the first song is the same as a category of the $i^{th}$ song in the first historical play record, $D_i$ is obtained through calculation by using the following formula:

$$D_i = \sqrt{(x_1 - x_0)^2 + (y_1 - y_0)^2 + (z_1 - z_0)^2}$$

$D_i$ is the difference between the first song and the $i^{th}$ song in the first historical record, N is the quantity of songs in the first historical play record, $x_1$, $y_1$, and $z_1$ are respectively a rhythm value of the first song, an age value of the first song, and a sadness/joy degree value of the first song, and $x_0$, $y_0$, and $z_0$ are respectively a rhythm value of the $i^{th}$ song in the first historical record, an age value of the song, and a sadness/joy degree value of the song.

When the server determines, based on the song category information, that the category of the first song is different from the category of the $i^{th}$ song in the first historical play record, $D_i$ is a preset fixed value.

In a possible implementation, the first message includes the information about the first song.

In a possible implementation, after the first electronic device displays a second historical play record, the method further includes: The first electronic device displays a song recommendation list, where the song recommendation list includes one or more songs of a same category as the first song.

In a possible implementation, before the second electronic device plays the first song, the method further includes: The first electronic device detects an operation that a user binds the second electronic device. In response to the operation, the first electronic device obtains the device information of the second electronic device, and sends the first account, the device information of the first electronic device, and the device information of the second electronic device to the server.

The server stores an association relationship between the first account and each of the device information of the first electronic device and the device information of the second electronic device.

In a possible implementation, after the first electronic device detects an operation that a user binds the second electronic device, the method further includes: When the first electronic device enables location service permission, the first electronic device sends the location information of the first electronic device to the server.

According to a third aspect, an embodiment of this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any possible implementation of the first aspect.

According to a fourth aspect, an embodiment of this application provides a computer storage medium The computer storage medium stores a computer program. The computer program includes program instructions. When the program instructions are run on an electronic device, the electronic device is enabled to perform the method according to any possible implementation of the first aspect.

According to a fifth aspect, an embodiment of this application provides a computer program product. When the computer program product is run on a computer, the computer is enabled to perform the method according to any possible implementation of the first aspect.

DESCRIPTION OF EMBODIMENTS

Figure 1:
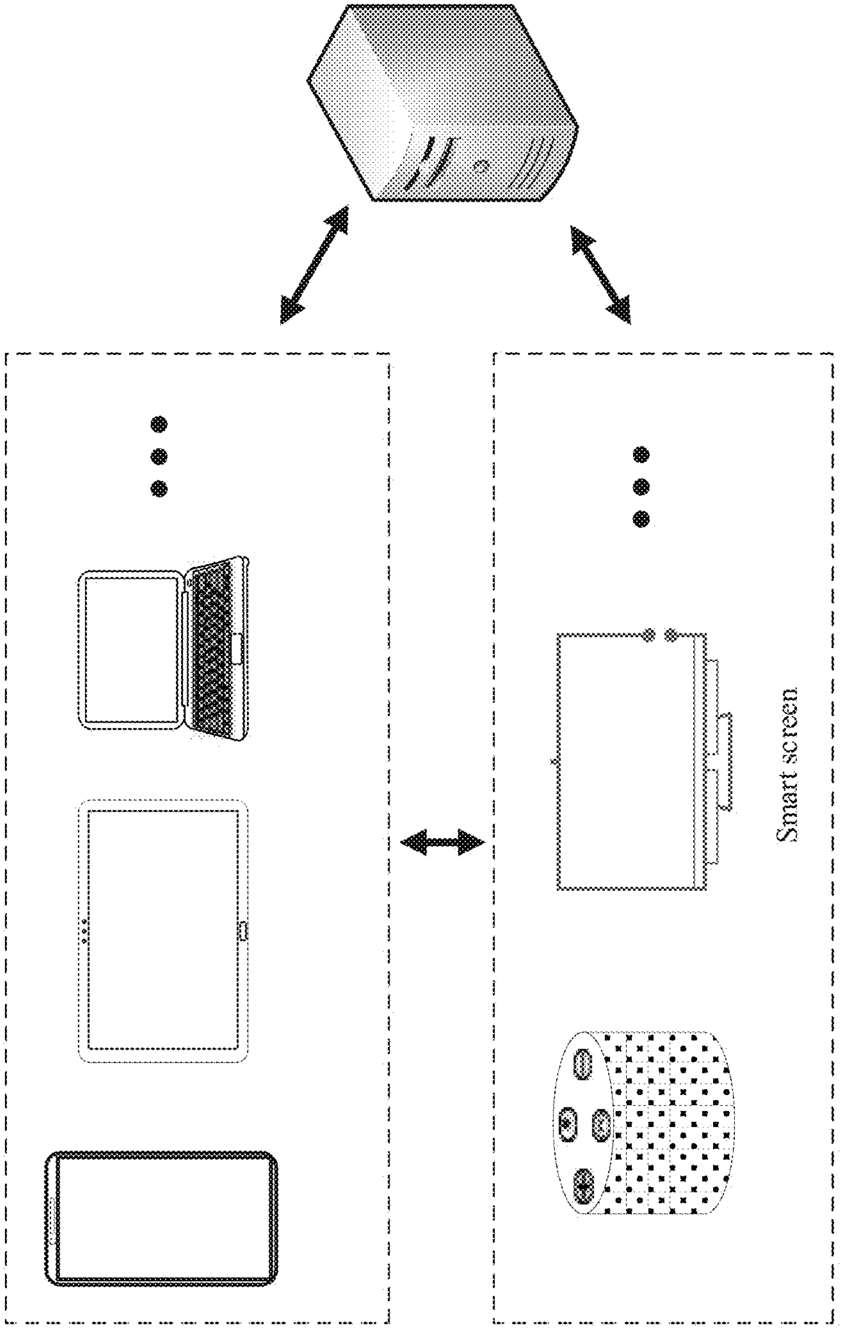
FIG. 1 is a schematic diagram of an architecture of a communication system according to an embodiment of this application.

The following clearly and completely describes technical solutions in embodiments of this application with reference to the accompanying drawings in embodiments of this application. In descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

It should be understood that terms "first", "second", and the like in the specification, claims, and accompanying drawings of this application are intended to distinguish between different objects but do not describe a particular order. In addition, terms "including", "having", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular feature, structure, or characteristic described with reference to an embodiment may be included in at least one embodiment of this application. The phrase shown in various locations in the specification may not necessarily indicate a same embodiment, and is not an independent or optional embodiment exclusive from another embodiment. It is explicitly and implicitly understood by a person skilled in the art that an embodiment described in this application may be combined with another embodiment.

A term "user interface (user interface, UI)" in the following embodiments of this application is a medium interface for interaction and information exchange between an application program or an operating system and a user, and implements conversion between an internal form of information and a form acceptable to the user. The user interface is source code written in a specific computer language such as Java or an extensible markup language (extensible markup language, XML). Interface source code is parsed and rendered on an electronic device, and is finally presented as user-recognizable content. The user interface is usually represented in a form of a graphical user interface (graphical user interface, GUI), and is a user interface that is related to a computer operation and that is displayed in a graphic manner. The user interface may be a visual interface element such as a text, an icon, a button, a menu, a tab, a text box, a dialog box, a status bar, a navigation bar, or a widget that is displayed on a display of the electronic device.

With development of internet of things (Internet of Things, IoT) technologies, an increasing quantity of smart home devices (which are also referred to as IoT devices)

such as smart speakers and smart televisions come into use in households. These IoT devices may support user voice operations, and have multimedia data play (for example, music data play and video data play) and other functions.

Considering control on rights and interests of a user, these IoT devices usually need to be bound to a same account as a personal device (for example, a mobile phone) of the user, and then the user may normally use a service (for example, a music service) provided by these IoT devices. Generally, an account is in a one-to-one correspondence with a user. In other words, different accounts correspond to different users. In this case, music play is used as an example. If the user requests, in a voice manner, an IoT device (for example, a smart speaker) to play music, the IoT device obtains, from a music server corresponding to the IoT device, a music resource that the user requests to play, and plays the music resource. However, the music server cannot distinguish whether the request is initiated by the user of the personal device (that is, an account owner or an owner user) or another family member of the user, and therefore cannot distinguish whether play data is generated by the user of the personal device or generated by the another family member of the user.

The music server subsequently needs to recommend content to the user of the personal device based on a historical play data record of the user. Therefore, for this part of data that the user indicates, in the voice manner, the IoT device to play, the music server usually uses two processing manners: One processing manner is that the music server may discard this part of data. In other words, the music server does not use this part of data as a data source for content recommendation. In this way, if this part of data is generated by the user of the personal device, data sources for content recommendation are reduced, so that accuracy of content recommendation is reduced. Another processing manner is that the music server may directly store this part of data into the historical play data record generated by the user of the personal device. In other words, this part of data may also be used as a part of the data sources for subsequent content recommendation. In this way, if this part of data is not generated by the user of the personal device, data in the historical play data record generated by the user of the personal device is polluted. Consequently, accuracy of content recommendation is reduced, recommendation effect is poor, and user experience is poor.

Currently, a common method for resolving the foregoing problem is using a voiceprint recognition technology to determine whether the user that currently uses the IoT device is the user of the personal device bound to a same account as the IoT device.

Specifically, in a process in which the IoT device is bound to a user account of a personal device, the IoT device prompts the user to enter voice information, records the voice information, and then may extract a voiceprint feature in the voice information and store the voiceprint feature. After account binding is completed, music play is used as an example. If the IoT device receives a voice request of a user for playing music, the IoT device may extract a voiceprint feature in the voice request, and match the voiceprint feature with the prestored voiceprint feature to determine whether the user that initiates the voice request is the user corresponding to the bound account (that is, the account owner). If the matching succeeds, the IoT device determines that the user that initiates the voice request is the account owner. If the matching fails, the IoT device determines that the user that initiates the voice request is not the account owner. Further, the IoT device may obtain, from the music server corresponding to the IoT device, a music resource that the user requests to play, and play the music resource. In addition, the IoT device may further send indication information to the music server corresponding to the IoT device, where the indication information indicates whether the user that initiates the voice request is the account owner. Further, after receiving the indication information, the music server may determine whether the user that initiates the voice request is the account owner. If the user that initiates the voice request is the account owner, the music server may store, in a historical play data record of the account owner, music data that the user requests to play, so that the music data may be used as a data source for subsequent content recommendation.

However, implementation of voiceprint recognition requires a processor to have a specific computing capability. Central processing units (central processing units, CPUs) of some IoT devices (for example, a smart speaker) have a weak computing capability, and cannot perform real-time voiceprint calculation and voiceprint feature comparison. Therefore, few IoT devices have a voiceprint recognition capability. For these IoT devices that do not have the voiceprint recognition capability, the server cannot distinguish whether data played by the IoT devices is generated by the user of the personal device or generated by the another family member of the user.

Based on this, an embodiment of this application provides a play record display method. The IoT device and the personal device of the user may be bound to a same account. After the IoT device receives a voice request of playing multimedia data (for example, music data) from the user, the IoT device may obtain, from the server, a multimedia data resource that the user requests to play and play the multimedia data resource, and the server may determine whether a distance between the personal device and the IoT device is less than or equal to a preset distance threshold. If the distance between the personal device and the IoT device is less than or equal to the preset distance threshold, the server may further calculate, based on a pre-stored historical play data record of the bound account, a preference degree of the user for the multimedia data that the user requests to play. If the preference degree is high, the server may determine that the user that initiates the voice request is an account owner of the bound account. Compared with the foregoing voiceprint recognition, this manner is simpler, and has a lower computing capability requirement on hardware. Further, when it is determined that the user that initiates the voice request is the account owner of the bound account, the server may store, in the historical play data record of the bound account, the multimedia data that the user requests to play, and use the multimedia data as a data source for subsequent content recommendation. In this way, the accuracy of content recommendation may be improved, and user experience may be improved.

The following describes a communication system according to an embodiment of this application.

FIG. 1 shows an example of a communication system according to an embodiment of this application.

As shown in FIG. 1, the communication system may include a personal device (that is, an electronic device 100), a smart home device (that is, an electronic device 200, which may also be referred to as an IoT device), and a server 300.

The personal device (that is, the electronic device 100) may be an intelligent terminal device used by a user personally, for example, a mobile phone, a tablet computer, or a notebook computer. A specific type of the personal device is not limited in embodiments of this application. It is easy to understand that the personal device is generally an electronic device that is conveniently carried around by the user personally. Therefore, location information of the personal device may also represent location information of the user.

The smart home device (that is, the electronic device 200) may be an intelligent terminal device that can be commonly used by both the user and other family members of the user, for example, a smart speaker or a smart screen, and may receive a voice instruction of the user and perform a corresponding function based on the voice instruction. Compared with the personal device, the smart home device is usually a non-portable device, is usually not carried around by the user, and is not randomly moved by the user. Therefore, it may be considered that location information of the smart home device is fixed.

The personal device and the smart home device in the communication system may be connected by logging in to a same account. For example, the personal device and the smart home device may log in to a same Huawei account, and may be remotely connected to and communicate with each other through the server. The account may be a mobile phone number, an email address, a customized user name, a user name allocated by an application (application, APP) server, a user name used for login in an APP in the electronic device, or the like.

A connection may further be established between the personal device and the smart home device in the communication system in a manner of scanning a quick response code, using near field communication (near field communication, NFC) OneHop, searching for a Bluetooth device, or the like. This is not limited in embodiments of this application.

In general, communication connections established between the personal device and the smart home device in the communication system may include but are not limited to: a wired connection, a wireless connection such as a Bluetooth (Bluetooth, BT) connection, a wireless local area network (wireless local area network, WLAN) such as a wireless fidelity point-to-point (wireless fidelity point-to-point, Wi-Fi P2P) connection, a wireless fidelity (wireless fidelity, Wi-Fi) connection, a near field communication (near field communication, NFC) connection, an infrared (infrared, IR) technology connection, a remote connection (for example, a connection established through a server), and the like.

In addition, the personal device and the smart home device in the communication system may alternatively be connected to and communicate with each other by combining several of the foregoing manners. This is not limited in embodiments of this application.

The personal device and the smart home device in the communication system may be configured with a same software operating system (operating system, OS) or different software operating systems (operating systems, OSs), including but not limited to Android®, Windows® Harmony®, and the like. Harmony® is Huawei HarmonyOS.

Both the personal device and the smart home device in the communication system may establish a communication connection to the server 300 by using a wired network or a wireless network, so that data exchange may be performed based on the communication connection.

The server 300 may be a conventional server, or may be a cloud server. This is not limited in embodiments of this application.

In an embodiment of this application, the server 300 may be configured to provide a multimedia data play resource (for example, a music data play resource or a video data play resource) for the intelligent terminal device (for example, the electronic device 100 and the electronic device 200), may further be configured to be responsible for account login and device management, for example, store information about a registered and logged-in account and device information of all intelligent terminal devices associated with the account information, may further store location information, internet protocol (internet protocol, IP) address information, and the like of a user corresponding to the logged-in account, may further be configured to store a historical play record of multimedia data of the user corresponding to the logged-in account, calculate a preferred content type of the user based on the historical play record, and recommend content of a related type to the user, and the like.

In an embodiment of this application, both the electronic device 100 and the electronic device 200 have a multimedia data play function (for example, a music play function and a video play function). The electronic device 100 and the electronic device 200 may log in to a same account, and may use the same account to access the server 300, obtain the multimedia data play resource from the server 300, report location information to the server 300, and the like.

The following describes a play record display method according to an embodiment of this application.

Figure 2:
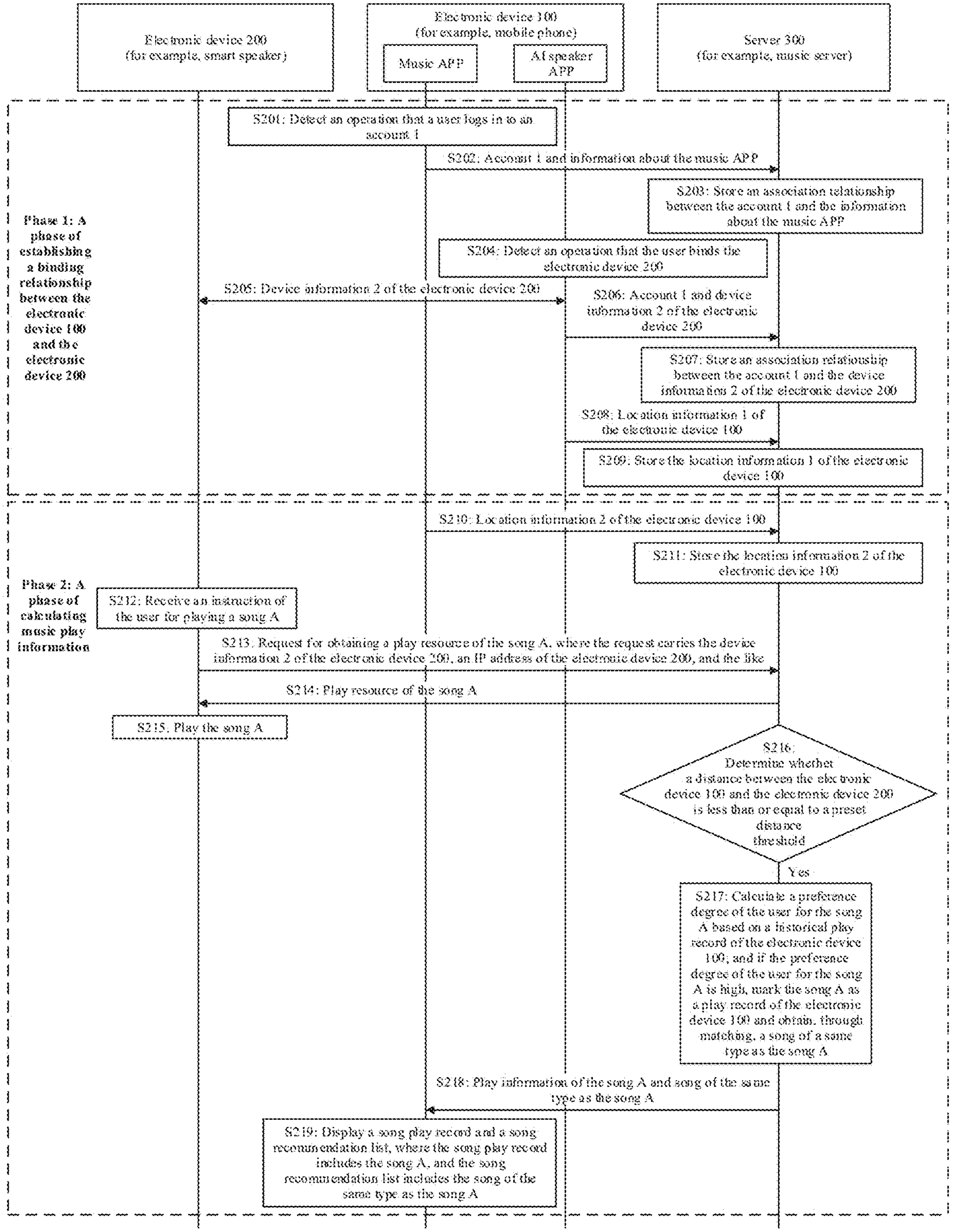
FIG. 2 is a schematic flowchart of a play record display method according to an embodiment of this application.

FIG. 2 shows an example of a specific procedure of a play record display method according to an embodiment of this application.

As shown in FIG. 2, the method may be applied to a communication system including an electronic device 100, an electronic device 200, and a server 300. In this embodiment of this application, an example in which play data is music data is used for description. The electronic device 100 may be a mobile phone. The electronic device 200 may be a smart speaker. The server 300 may be a music server. A music APP and an AI speaker APP may be installed on the electronic device 100. A same account (for example, a Huawei account) is logged in to on both the music APP and the AI speaker APP. The music APP is configured to play music and may be a system application or a third-party application. The AI speaker APP is configured to manage a smart speaker that establishes a connection to the electronic device 100 to play music on the electronic device 100, and the like. Music data play resources used when the electronic device 100 and the electronic device 200 play music are all obtained from the server 300. The following describes in detail specific steps of the method.

Phase 1: A Phase of Establishing a Binding Relationship Between the Electronic Device 100 and the Electronic Device 200

S201 to S203: The electronic device 100 detects an operation that a user logs in to an account 1 on the music APP; after the user logs in to the account I on the music APP, the electronic device 100 sends the account 1, information about the music APP, and the like to the server 300; and the server 300 may store an association relationship between the account 1 and the information about the music APP.

The account 1 may be a system account (for example, a Huawei account) of the electronic device 100. The information about the music APP may include but is not limited to information such as an identifier of the music APP.

The association relationship that is between the account 1 and the information about the music APP and that is stored by the server 300 may be an association relationship shown as an example in Table 1.

TABLE 1

| Account | APP information |
|---|---|
| Account 1 | Information about the music APP |
| . . . | . . . |

In some embodiments, the electronic device 100 may further send device information 1 of the electronic device 100 to the server 300, and the server 300 may further store an association relationship between the account 1 and the device information 1 of the electronic device 100.

The device information 1 of the electronic device 100 may include but is not limited to information such as a device identifier, a serial number, a media access control address, a device model, and a device name of the electronic device 100. This is not limited in embodiments of this application.

After the user logs in to the account I on the music APP, if the user plays music (for example, plays a song 1 or a song 2) on the music APP, because all music data play resources of the music played by the user are obtained from the server 300, as shown as an example in Table 2, the server 300 may further store a record (that is, a historical play record) of music played by the user on the music APP under the account 1.

TABLE 2

| Account | Historical play record |
|---|---|
| Account 1 | Song 1<br>Song 2<br>. . . |
| . . . | . . . |

It should be noted that, in step S201, the operation that the user logs in to the account 1 on the music APP may be an operation that the user enters information such as the account 1 and a password of the account 1 when logging in to the music APP for the first time, or may be an operation that the user starts the music APP after logging in to the system account of the electronic device 100 and the music APP is logged in to by using the system account of the electronic device 100 by default, or may be an operation that the user exits the music APP after logging in to the music APP for the first time, then starts the music APP again, and logs in to an account again. This is not limited in embodiments of this application.

S204 to S207: After the user logs in to the account 1 on the AI speaker APP of the electronic device 100, the electronic device 100 detects an operation that the user binds the electronic device 200; in response to the binding operation, the electronic device 100 may obtain device information 2 of the electronic device 200, and send information such as the account 1 and the device information 2 of the electronic device 200 to the server 300; and the server 300 may store an association relationship between the account 1 and the device information 2 of the electronic device 200.

The account 1 may be the system account (for example, the Huawei account) of the electronic device 100. The device information 2 of the electronic device 200 may include but is not limited to information such as a device identifier, a serial number, a media access control address, a device model, and a device name of the electronic device 200. This is not limited in embodiments of this application.

The electronic device 100 may scan, by using a Bluetooth scanning function, a Bluetooth broadcast signal transmitted by the electronic device 200, and obtain the device information 2 of the electronic device 200 from the Bluetooth broadcast signal transmitted by the electronic device 200.

The association relationship that is between the account 1 and the device information 2 of the electronic device 200 and that is stored by the server 300 may be an association relationship shown as an example in Table 3.

TABLE 3

| Account | Device information |
|---|---|
| Account 1 | Device information 2 of the electronic device 200 |
| . . . | . . . |

It should be noted that a time sequence of performing step S201 to step S203 and performing step S204 to step S207 is not limited in this embodiment of this application. For example, step S204 to step S207 may alternatively be performed before the electronic device 100 performs step S201 to step S203.

In some embodiments, because the electronic device 100 logs in to the account 1 on the AI speaker APP, in addition to sending the account 1 and the device information 2 of the electronic device 200 to the server 300, the electronic device 100 may further send the device information 1 of the electronic device 100 to the server 300. In this way, as shown as an example in Table 4, the server 300 may store the association relationship between the account 1 and the device information 2 of the electronic device 200 and the association relationship between the account 1 and the device information 1 of the electronic device 100.

TABLE 4

| Account | Device information |
|---|---|
| Account 1 | Device information 1 of the electronic device 100<br>Device information 2 of the electronic device 200 |
| . . . | . . . |

If the server 300 has stored the association relationship between the account 1 and the device information 1 of the electronic device 100 before, for example, the server 300 has stored the association relationship between the account 1 and the device information 1 of the electronic device 100 in step S203, the association relationship does not need to be repeatedly stored this time.

It should be noted that, in step S204, the operation that the user logs in to the account I on the AI speaker APP may be an operation that the user enters information such as the account 1 and the password of the account 1 when logging in to the AI speaker APP for the first time, or may be an operation that the user starts the AI speaker APP after logging in to the system account of the electronic device 100 and the music APP is logged in to by using the system account of the electronic device 100 by default, or may be an operation that the user exits the AI speaker APP after logging in to the AI speaker APP for the first time, then starts the AI speaker APP again, and logs in to the account again. This is not limited in embodiments of this application.

The following describes a user interface shown as an example in a process of establishing the binding relationship between the electronic device 100 and the electronic device 200 with reference to FIG. 3A to FIG. 3F.

Figure 3A:
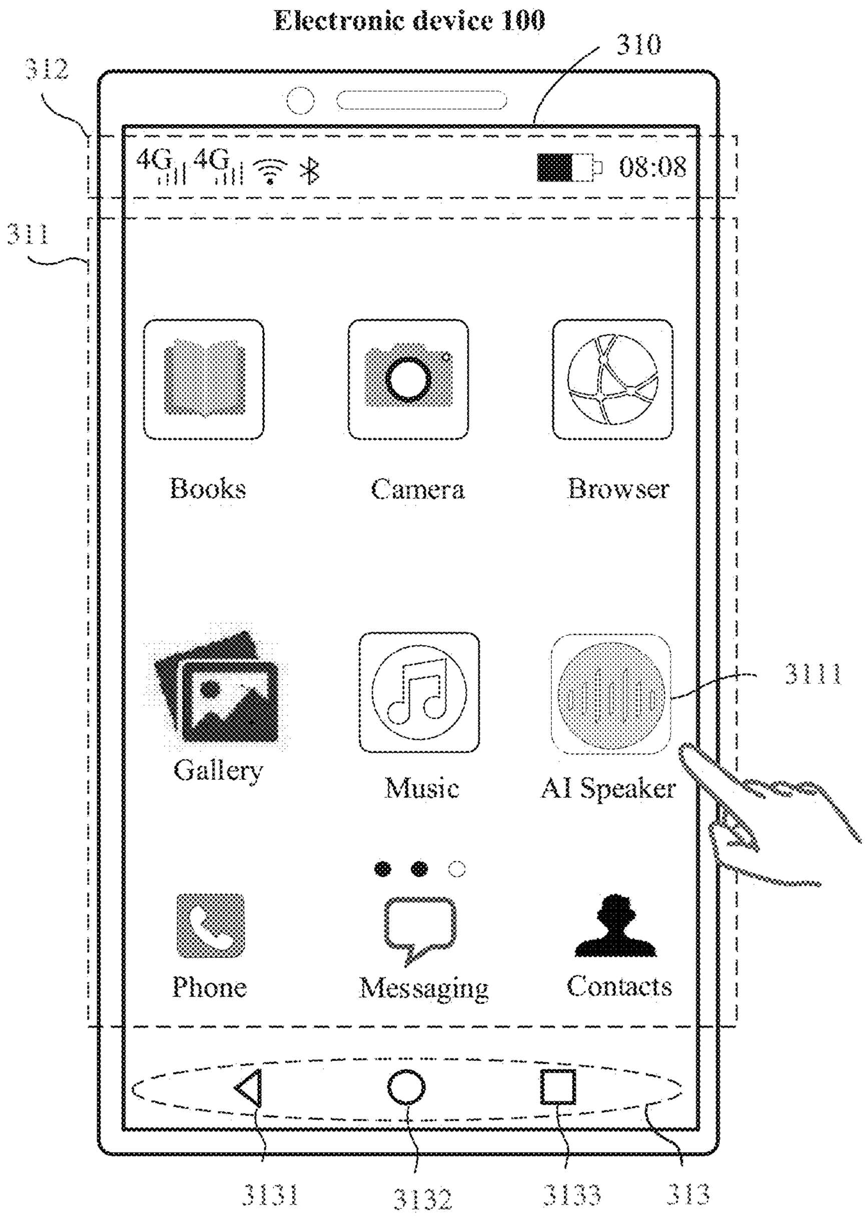
FIG. 3A to FIG. 3F are schematic diagrams of a group of user interfaces in a process of establishing a binding relationship between an electronic device 100 and an electronic device 200 according to an embodiment of this application.

As shown in FIG. 3A, the electronic device 100 may display a home screen interface 310. The interface 310 may include an application icon display area 311, a status bar display area 312, and a navigation bar display area 313.

The application icon display area 311 may include, for example, an icon of "Books", an icon of "Camera", an icon of "Browser", an icon of "Gallery", an icon of "Music", and an icon 3111 of "AI speaker", and may further include an icon of another application. This is not limited in embodiments of this application. An icon of any application may be used to respond to an operation of the user, for example, a tap operation, so that the electronic device 100 starts the application corresponding to the icon.

The status bar display area 312 may include time, a Wi-Fi icon, signal strength, a current remaining battery level, a Bluetooth icon, and the like.

The navigation bar display area 313 may include: system navigation buttons such as a back button 3131, a home screen (home screen) button 3132, and a historical call-out task button 3133.

The electronic device 100 may detect an operation (for example, a tap operation) performed by the user on the icon 3111 of the AI speaker application. In response to the operation, the electronic device 100 may display a user interface 320 shown as an example in FIG. 3B. The user interface 320 may include an account indication 321, a prompt 322, an option 323, and the like.

The account indication 321 may prompt a login account of the AI speaker application, for example, a login account 1 "136**1672", where the account 1 may be the system account (for example, the Huawei account) of the electronic device 100. When another application (for example, a music application) in the electronic device 100 has logged in to the account 1, the electronic device 100 may log in to the account 1** by default on the AI speaker application.

Figure 3B:
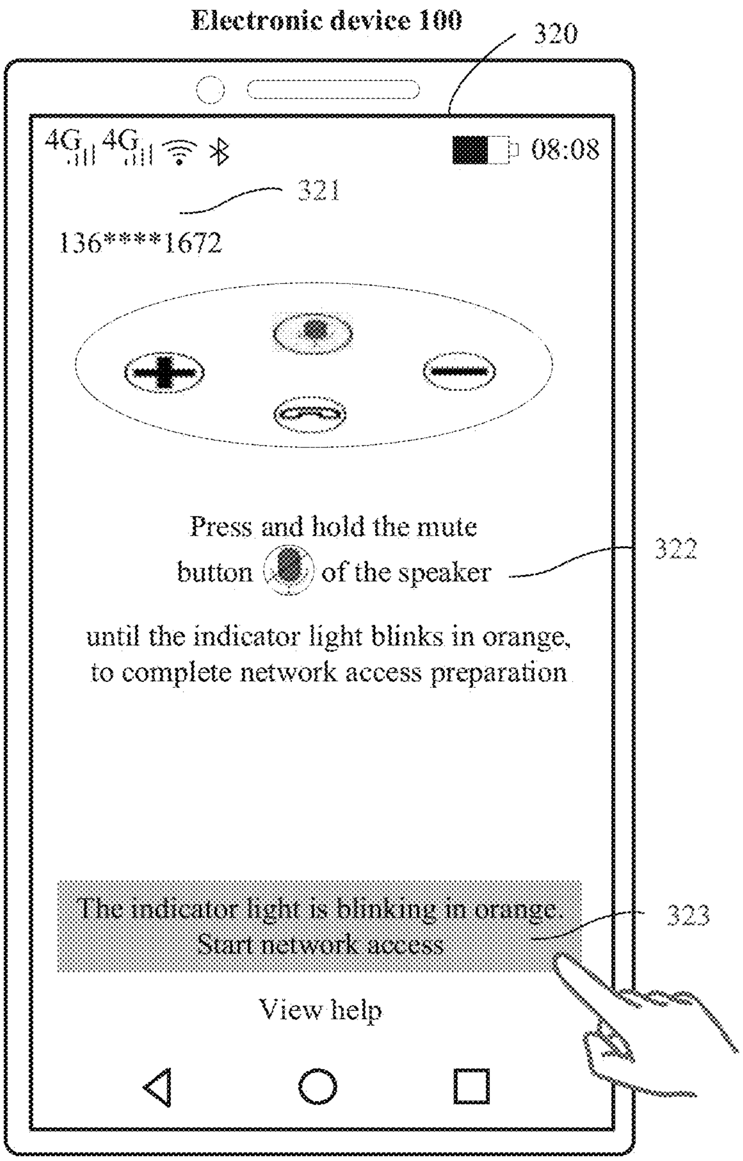

The prompt 322 may prompt an operation that needs to be performed by the user on the electronic device 200, for example, a prompt "Press and hold the mute button of the speaker until the indicator light blinks in orange, to complete network access preparation" shown as an example in FIG. 3B.

The option 323 may include a prompt "The indicator light is blinking in orange. Start network access".

The user may perform a corresponding operation on the smart speaker (that is, the electronic device 200) based on the prompt 322 in the user interface 320, that is, press and hold the mute button on the smart speaker until the indicator light blinks in orange. Then, in response to an operation (for example, a tap operation) performed by the user on the option 323, the electronic device 100 may scan the electronic device 200.

For example, the electronic device 100 may perform scanning by using the Bluetooth scanning function. Specifically, the electronic device 100 may scan, by using the Bluetooth scanning function, the Bluetooth broadcast signal transmitted by the electronic device 200. The Bluetooth broadcast signal may include but is not limited to the information such as the device identifier, the serial number, the media access control address, the device model, and the device name of the electronic device 200. The media access control address included in the Bluetooth broadcast signal transmitted by the electronic device 200 may be used by the electronic device 100 for subsequently sending network access information to the electronic device 200, and the network access information may include a Wi-Fi name and a corresponding password.

Figure 3C:
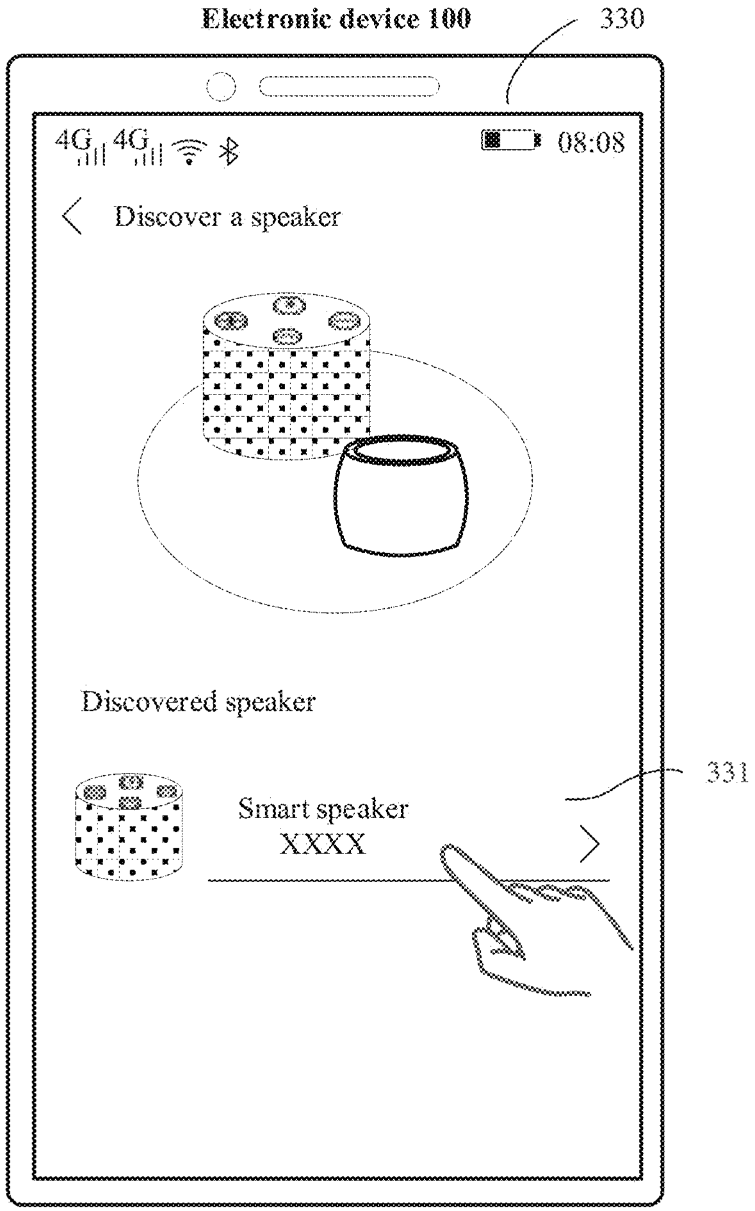
Figure 3D:
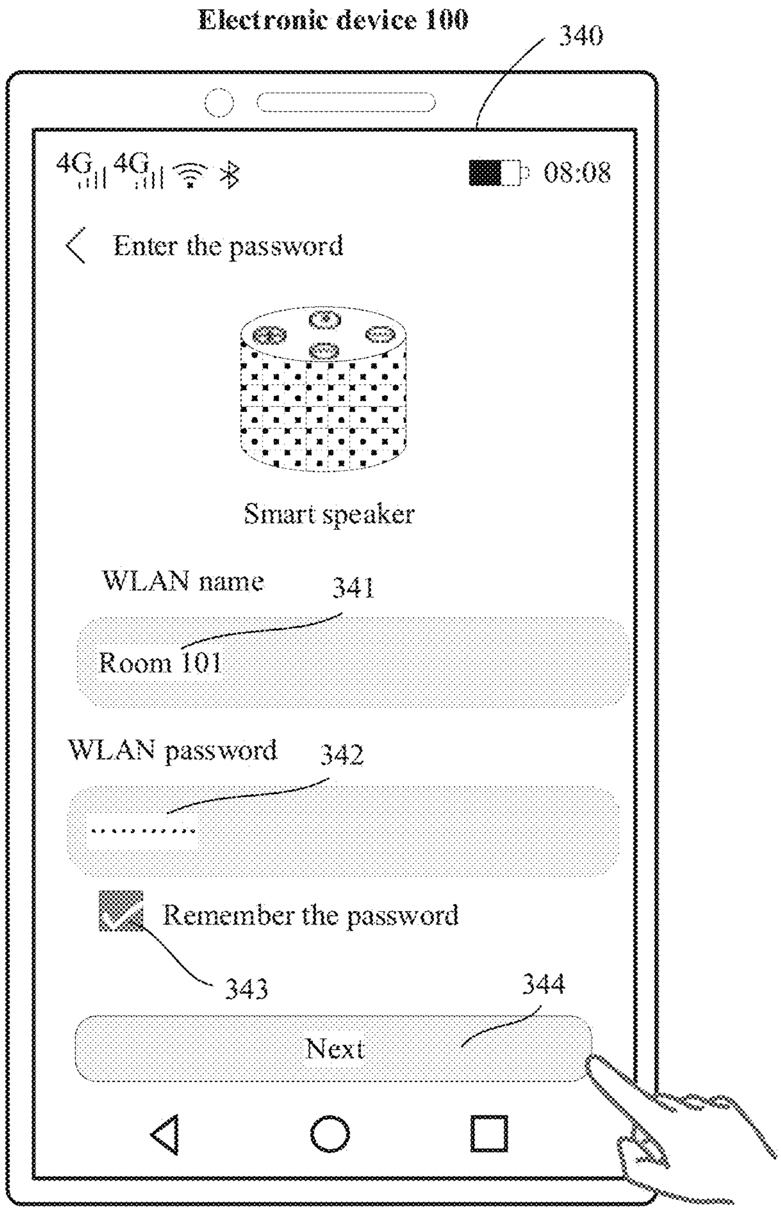

After the electronic device 200 is discovered through scanning, the electronic device 100 may display a user interface 330 shown as an example in FIG. 3C. The user interface 330 may include an option corresponding to one or more speakers discovered by the electronic device 100 through scanning, for example, an option 331 corresponding to a "smart speaker XXXX".

It is assumed that the "smart speaker XXXX" is the electronic device 200. Further, the electronic device 100 may detect an operation (for example, a tap operation) performed by the user on the option 331. In response to the operation, the electronic device 100 may display a user interface 340 shown as an example in FIG. 3D. The user interface 340 may include a WLAN name input box 341, a WLAN password input box 342, an option 343, an option 344, and the like.

The WLAN name input box 341 and the WLAN password input box 342 may be respectively configured to input a Wi-Fi name (for example, "room 101") and a corresponding password. The Wi-Fi name may be a service set identifier (service set identifier, SSID) of a Wi-Fi hotspot.

In response to an operation (for example, a tap operation) performed by the user on the option 343, the option 343 may be displayed in a selected state. When the Wi-Fi named "room 101" is subsequently used, the electronic device 100 may obtain the corresponding password without user input.

In response to an operation (for example, a tap operation) performed by the user on the option 344, the electronic device 100 may send the network access information to the electronic device 200. For example, the electronic device 100 may send the network access information to the electronic device 200 based on the media access control address included in the Bluetooth broadcast signal transmitted by the electronic device 200. For example, the network access information includes the foregoing Wi-Fi name and the corresponding password. The electronic device 100 may be connected to the Wi-Fi named "room 101". The electronic device 200 may also be connected to the Wi-Fi named "room 101" based on the network access information.

Figure 3E:
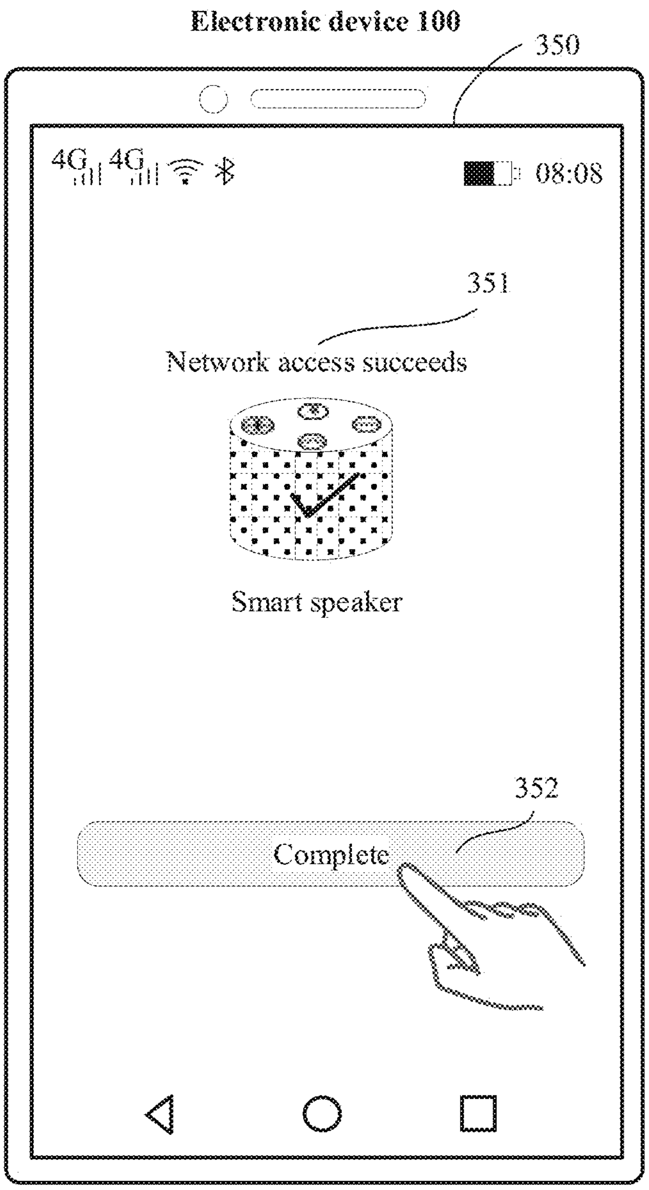
Figure 3F:
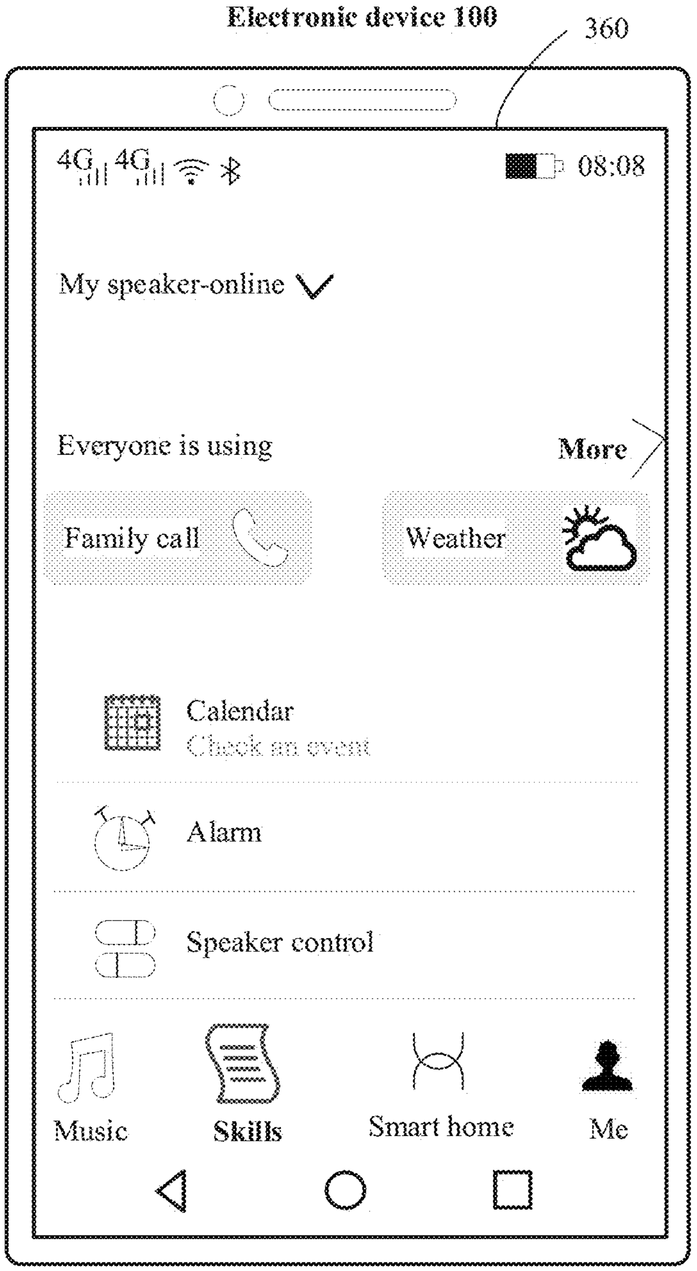

After the network access succeeds, the electronic device 100 may display a user interface 350 shown as an example in FIG. 3E. The user interface may include a network access success prompt 351 and a "Complete" option 352. The electronic device 100 may detect an operation performed by the user on the "Complete" option 352. In response to the operation, the electronic device 100 displays a user interface 360 shown as an example in FIG. 3F, to support the user to use a plurality of functions provided by the AI speaker application.

By now, the binding relationship is successfully established between the electronic device 100 and the electronic device 200, and both the electronic device 100 and the electronic device 200 are associated with the same account (that is, the foregoing account 1).

After the binding relationship is established, the electronic device 100 may store the association relationship between the account 1 and the device information 2 of the electronic device 200, and send the association relationship to the server 300.

In some embodiments, the electronic device 100 may further send the association relationship between the account 1 and the device information 2 of the electronic device 200 to the electronic device 200, and the electronic device 200 may store the association relationship. In this case, the association relationship between the account 1 and the device information 2 of the electronic device 200 may alternatively be sent by the electronic device 200 to the server 300.

It should be noted that an occasion for the electronic device 100 or the electronic device 200 to send the association relationship between the account 1 and the device information 2 of the electronic device 200 to the server 300 is not limited in embodiments of this application. In a possible implementation, the electronic device 100 may send the association relationship between the account 1 and the device information 2 of the electronic device 200 to the server 300 after detecting the operation performed by the user on the option 331 shown in FIG. 3C. In another possible implementation, the electronic device 100 may alternatively send the association relationship between the account 1 and the device information 2 of the electronic device 200 to the server 300 after detecting the operation performed by the user on the option 352 shown in FIG. 3E.

S208 and S209: The electronic device 100 sends location information 1 of the electronic device 100 to the server 300, and after receiving the location information 1 of the electronic device 100, the server 300 may store the location information 1 of the electronic device 100.

The location information 1 of the electronic device 100 is location information of the electronic device 100 when the binding relationship is established between the electronic device 100 and the electronic device 200. In a process of establishing the binding relationship between the electronic device 100 and the electronic device 200, a distance between the electronic device 100 and the electronic device 200 needs to be less than or equal to a preset distance threshold. In other words, the electronic device 100 needs to be near/besides the electronic device 200. In addition, the electronic device 200 is a non-portable device, and a user generally does not move a location of the electronic device 200. Therefore, the location information 1 of the electronic device 100 may indicate that the electronic device 100 is near/besides the electronic device 200.

It is easy to understand that the location information 1 of the electronic device 100 may be obtained only when the user allows the electronic device 100 to enable location service permission. Therefore, step S208 and step S209 may be performed only when the user allows the electronic device 100 to enable the location service permission.

Figure 4A:
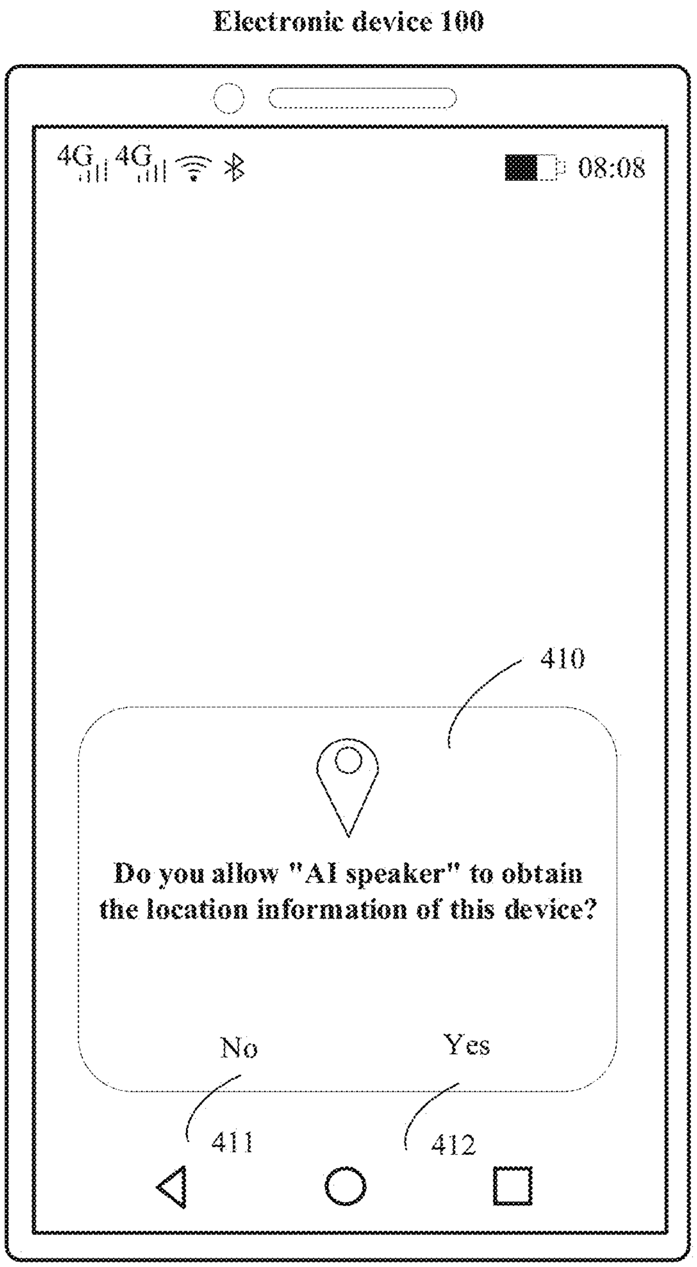
FIG. 4A and FIG. 4B are schematic diagrams of a group of user interfaces for prompting a user to enable location permission according to an embodiment of this application.

For example, as shown in FIG. 4A, the electronic device 100 may display a window 410, to prompt the user to enable the location service permission. When detecting an operation (for example, an operation of tapping an option 412) that the user allows the enabling of the location service permission, the electronic device 100 may obtain the location information 1 of the electronic device 100 by using a location service, and send the location information 1 of the electronic device 100 to the server 300. When detecting an operation (for example, an operation of tapping an option 411) that the user prohibits the enabling of the location service permission, the electronic device 100 cannot obtain the location information 1 of the electronic device 100. Therefore, step S208 and step S209 are not performed.

It should be noted that an occasion for performing step S208 and step S209 is not limited in embodiments of this application. Step S208 and step S209 may be performed in the process of establishing the binding relationship between the electronic device 100 and the electronic device 200, or may be performed when establishment of the binding relationship between the electronic device 100 and the electronic device 200 is completed.

Phase 2: A Phase of Calculating Music Play Information

S210 and S211: The electronic device 100 sends location information 2 of the electronic device 100 to the server 300, and after receiving the location information 2 of the electronic device 100, the server 300 may store the location information 2 of the electronic device 100.

Specifically, after both the electronic device 100 and the electronic device 200 are bound to the same account (for example, the foregoing account 1), the electronic device 100 may obtain the location information of the electronic device 100 periodically (that is, at an interval of a period of time, for example, 0.5 minutes, 1 minute, or 2 minutes), and send a location information obtaining result to the server 300, so that the server 300 subsequently determines whether the electronic device 100 is near the electronic device 200.

Figure 4B:
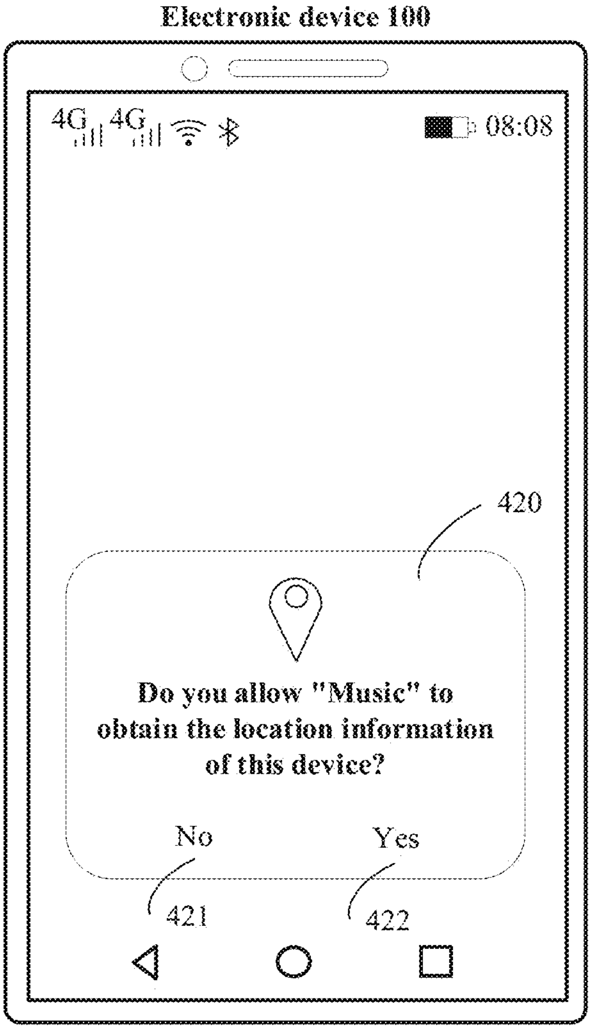

In a possible implementation, when the user allows the electronic device 100 to enable the location service permission (for example, the user taps the option 412 in FIG. 4A or the user taps an option 422 on a window 420 in FIG. 4B), the music APP or the AI speaker APP of the electronic device 100 may obtain the location information of the electronic device 100 at an interval of a period of time (for example, at an interval of 0.5 minutes, 1 minute, or 2 minutes) by using the location service, and may send, to the server 300 and after the location information of the electronic device 100 is successfully obtained, a message indicating that the location information is successfully obtained. The indication message carries the location information that is of the electronic device 100 (for example, the location information 2 of the electronic device 100) and that is obtained this time. After receiving the indication message, the server 300 may obtain the location information of the electronic device 100 from the indication message, and store the location information.

In another possible implementation, when the user prohibits the electronic device 100 from enabling the location service permission (for example, the user taps the option 411 in FIG. 4A or the user taps an option 421 in FIG. 4B), the electronic device 100 cannot obtain the location information of the electronic device 100. The electronic device 100 may send, to the server 300 at an interval of a period of time (for example, at an interval of 0.5 minutes, 1 minute, or 2 minutes), a message indicating that the location information fails to be obtained. The indication message may carry an IP address of the electronic device 100. After receiving the indication message, the server 300 may obtain the IP address of the electronic device 100 from the indication information, and store the IP address.

In another possible implementation, when the user allows the electronic device 100 to enable the location service permission, but the location information of the electronic device 100 cannot be successfully obtained due to a reason, the electronic device 100 may also send, to the server 300, a message indicating that the location information fails to be obtained. The indication message may carry an IP address of the electronic device 100 and the like. After receiving the indication message, the server 300 may obtain the IP address of the electronic device 100 from the indication information, and store the IP address.

It should be noted that, after both the electronic device 100 and the electronic device 200 are bound to the same account (for example, the foregoing account 1), for the location information or the IP address that is of the electronic device 100 and that is periodically obtained by the server 300, the server 300 may store only the location information or the IP address that is of the electronic device 100 and that is obtained most recently (that is, after the server 300 obtains and stores the location information or the IP address of the electronic device 100 most recently, the server 300 deletes the location information or IP address that is stored last time). The server 300 may alternatively store the obtained location information or the IP address of the electronic device 100 in a period of time (for example, one day or one month), and mark time information, to distinguish when each piece of location information or each IP address is obtained by the server 300.

S212 to S215: The electronic device 200 receives an instruction of the user for playing a song A; then the electronic device 200 may send, to the server 300, a request for obtaining a play resource of the song A, where the request carries the device information 2 of the electronic device 200, an IP address of the electronic device 200, and the like; after receiving the request, the server 300 may send the play resource of the song A to the electronic device 200; and after receiving the play resource of the song A, the electronic device 200 may play the song A based on the play resource.

Figure 5:
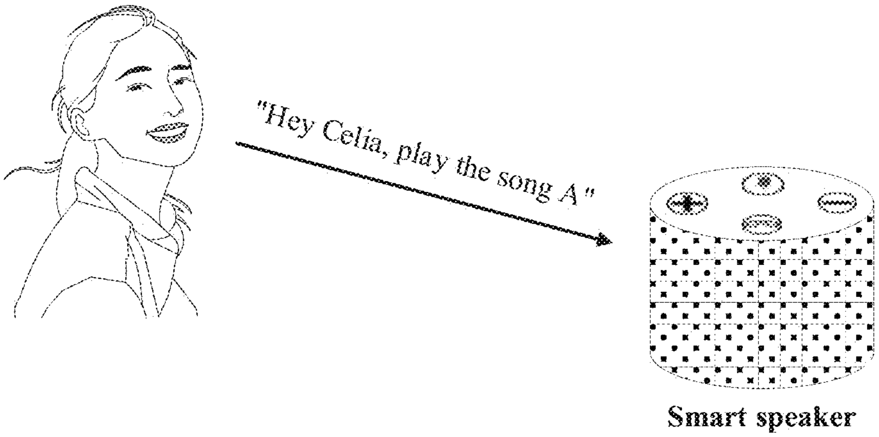
FIG. 5 is a schematic diagram of a scenario in which a user requests, in a voice manner, a smart speaker to play a song.

For example, the instruction of the user for playing the song A may be a voice instruction "Hey Celia, play the song A" initiated by the user shown in FIG. 5.

In some embodiments, after receiving the request, sent by the electronic device 200, for obtaining the play resource of the song A, the server 300 may obtain the IP address of the electronic device 200 from the request, and store the IP address, so that when the server 300 cannot obtain the location information of the electronic device 100 subsequently, the server 300 may determine, based on the IP address of the electronic device 200 and the IP address of the electronic device 100, whether the electronic device 100 is near the electronic device 200.

The foregoing request for obtaining the play resource of the song A may further include information about the song A (for example, a name of the song A), so that the server 300 may search for the play resource of the song A based on the information about the song A.

S216: The server 300 determines whether the distance between the electronic device 100 and the electronic device 200 is less than or equal to the preset distance threshold.

Specifically, after the server 300 receives the request, sent by the electronic device 200, for obtaining the play resource of the song A, the server 300 may determine, based on the location information or the IP address that is of the electronic device 100 and that is stored most recently, whether the distance between the electronic device 100 and the electronic device 200 is less than or equal to the preset distance threshold. If the distance between the electronic device 100 and the electronic device 200 is less than or equal to the preset distance threshold, subsequent steps continue to be performed. If the distance between the electronic device 100 and the electronic device 200 is not less than or equal to the preset distance threshold, the subsequent steps are not performed Possible implementations in which the server 300 determines whether the distance between the electronic device 100 and the electronic device 200 is less than or equal to the preset distance threshold may include but is not limited to the following two implementations.

Possible Implementation 1:

The server 300 determines, based on the location information periodically reported by the electronic device 100 and location information obtained when the account is bound, whether the distance between the electronic device 100 and the electronic device 200 is less than or equal to the preset distance threshold.

For example, it is assumed that the server 300 stores the location information of the electronic device 100 most recently (that is, the server 300 successfully obtains the location information reported by the electronic device 100 most recently), for example, the location information 2 of the electronic device 100. In addition, when the server 300 further stores the location information 1 (that is, the location information obtained when the account is bound) that is of the electronic device 100 and that is sent by the electronic device 100 in the foregoing account binding process, the server 300 may determine whether the location information 2 of the electronic device 100 is the same as the location information 1 of the electronic device 100.

If the location information 2 of the electronic device 100 is the same as the location information 1 of the electronic device 100, because the electronic device 200 is a non-portable device, and the user generally does not move the location of the electronic device 200, it may be considered that the location of the electronic device 200 remains unchanged before and after the account is bound. Therefore, the server 300 may determine that the distance between the electronic device 100 and the electronic device 200 is less than or equal to the preset distance threshold. In other words, the server 300 may determine that the electronic device 100 is near the electronic device 200. Further, because the electronic device 100 is a portable device, and the user usually carries around the electronic device 100, the server 300 may further determine that the user (that is, an account owner of the account 1) of the electronic device 100 is near the electronic device 200.

If the location information 2 of the electronic device 100 is different from the location information 1 of the electronic device 100, the server 300 may determine that the user of the electronic device 100 is not near the electronic device 200. In this case, the instruction, received by the electronic device 200, for playing the song A is not initiated by the user of the electronic device 100. Therefore, the server 300 may determine that the song A is not the song that the user of the electronic device 100 requests to play, but may be the song that another family member of the user of the electronic device 100 requests to play. Therefore, the server 300 does not store play information of the song A in a historical play record of the user of the electronic device 100. Further, the server 300 does not use the song A as a data source for subsequent content recommendation to the user of the electronic device 100.

In an embodiment of this application, the location information of the electronic device 100 (for example, the location information 1 of the electronic device 100 and the location information 2 of the electronic device 100) may be obtained through an application programming interface (application programming interface, API) provided by a location service module built in the electronic device 100. The location information of the electronic device 100 may be positioning information of a GPS or may be positioning information of a base station. This is not limited in embodiments of this application.

In an embodiment of this application, whether the location information 1 of the electronic device 100 is the same as the location information 2 of the electronic device 100 may be determined by using longitude and latitude information included in the location information. For example, if integer digits and four decimal places of a longitude and latitude value in the location information 1 are all the same as integer digits and four decimal places of a longitude and latitude value in the location information 2, it is considered that the location information 1 is the same as the location information 2. Otherwise, it is considered that the location information 1 is different from the location information 2.

In some embodiments, considering different requirements for location precision, a quantity of decimal places of the longitude and latitude value may also be different. If higher precision is required, more decimal places may be required. For example, it is considered that the location information 1 is the same as the location information 2 only when five decimal places (or six decimal places, seven decimal places, or the like) are all the same. If lower precision is required, fewer decimal places may be required. For example, it may be considered that the location information 1 is the same as the location information 2 when three decimal places (or two decimal places, one decimal place, or the like) are all the same. This is not limited in embodiments of this application.

Possible Implementation 2:

The server 300 determines, based on the IP address of the electronic device 100 and the IP address of the electronic device 200, whether the electronic device 100 and the electronic device 200 are within a range of a same local area network. If the IP addresses of the electronic device 100 and the electronic device 200 are the same, it may be considered that the distance between the electronic device 100 and the electronic device 200 is less than or equal to the preset distance threshold. If the IP addresses of the electronic device 100 and the electronic device 200 are different, it may be considered that the distance between the electronic device 100 and the electronic device 200 is greater than the preset distance threshold. For example, when the server 300 fails to obtain the location information reported by the electronic device 100 most recently, and/or when the server 300 does not receive and store the location information 1 (that is, the location information obtained when the account is bound) that is of the electronic device 100 and that is sent by the electronic device 100 in the foregoing account binding process, the server 300 may determine whether the IP address that is of the electronic device 100 and that is stored most recently is the same as the IP address that is of the electronic device 200 and that is carried when the electronic device 200 sends, to the server 300, the request for obtaining the play resource of the song A.

If the IP addresses are the same, the server 300 may determine that the distance between the electronic device 100 and the electronic device 200 is less than or equal to the preset distance threshold. In other words, the electronic device 100 is near the electronic device 200. It may also be considered that the electronic device 100 and the electronic device 200 are at a same location. Optionally, the server 300 may further store location information that is currently determined based on the IP address as the location information of the electronic device 100 in the foregoing account binding process.

If the IP addresses are different, the server 300 may determine that the user of the electronic device 100 is not near the electronic device 200. In this case, the instruction, received by the electronic device 200, for playing the song A is not initiated by the user of the electronic device 100. Therefore, the server 300 may determine that the song A is not the song that the user of the electronic device 100 requests to play, but may be the song that the another family member of the user of the electronic device 100 requests to play. Therefore, the server 300 does not store the play information of the song A in the historical play record of the user of the electronic device 100. Further, the server 300 does not use the song A as the data source for subsequent content recommendation to the user of the electronic device 100.

It should be noted that a time sequence of performing step S216 and performing step S214 and step S215 is not limited in embodiments of this application.

S217: The server 300 calculates a preference degree of the user for the song A based on the historical play record of the electronic device 100; and if the preference degree of the user for the song A is high, the server 300 marks the song A as a play record of the electronic device 100 and obtains, through matching, a song of a same type as the song A.

It is easy to understand that when determining that the electronic device 100 is near the electronic device 200, the server 300 cannot determine that the instruction for playing the song A is definitely initiated by the user of the electronic device 100, and the instruction may alternatively be initiated by the another family member of the user of the electronic device 100. Therefore, to further determine whether the instruction for playing the song A is initiated by the user of the electronic device 100, the server 300 may calculate the preference degree of the user for the song A based on the pre-stored historical play record of the electronic device 100 (for example, the historical play record of the electronic device 100 on the music APP shown in Table 2). If the preference degree of the user for the song A is high, it may be determined that the instruction for playing the song A is initiated by the user of the electronic device 100 (that is, the song A is the song that the user of the electronic device 100 requests the electronic device 200 to play). Further, the server 300 may mark the song A as the play record of the electronic device 100. That is, the server 300 may store the song A in the historical play record of the electronic device 100, and may use the song A as the data source for subsequent content recommendation to the user of the electronic device 100 and obtain, through matching, the song of the same type as the song A.

The following describes a possible implementation in which the server 300 calculates the preference degree of the user for the song A.

First, the server 300 classifies and marks all songs on the server 300 in advance. Each song may correspond to two marks: a dimension mark D and a group mark G.

The dimension mark D may be a mark obtained by the server 300 through calculation based on information of one or more different dimensions of the song, such as a rhythm, an age, a sadness/joy degree, a timbre feature (for example, a male voice, a female voice, or a child's voice), and a singing form (for example, a chorus, a duet, or a solo).

The group mark G may be a mark obtained after the server 300 groups the song based on the type of the song. Songs may be generally classified into a plurality of types, for example, a rock type, a pop type, a rap type, and a children's song type. The server 300 may group the plurality of types of songs. For example, the server 300 may group the rock type, the pop type, and the rap type into one group, and group the children's song type into one group. For another example, the server 300 may group the rock type and the rap type into one group, group the pop type into one group, and group the children's song type into one group. A manner of grouping songs is not limited in embodiments of this application.

For example, when the dimension mark D is a three-dimensional mark obtained through calculation based on three different dimensions: the rhythm, the age, and the sadness/joy degree of the song, the dimension mark D of each song may be represented as D=[x, y, z], where x, y, and z may be all positive integers, x may represent the rhythm of the song, y may represent the age of the song, and z may represent the sadness/joy degree of the song. Assuming that a value range of x is [1, 10], 1 may indicate a slowest rhythm, and 10 may indicate a fastest rhythm. Assuming that a value range of y is [1, 8], 1 may indicate an earliest age (for example, the 1950s), and 8 may indicate a latest age (for example, after 2020). Assuming that a value range of z is [1, 10], 1 may indicate a maximum degree of joy (or a maximum degree of sadness), and 10 may indicate a minimum degree of joy (or a minimum degree of sadness).

For example, the group mark G of each song may be represented as G={group Id}, where group Id is an identifier of each group, and may be represented by using a number, a text, a graph, or the like. This is not limited in embodiments of this application, provided that different groups can be distinguished. For example, the server 300 may divide all songs into two groups. For example, the rock type, the pop type, and the rap type are grouped into one group, and the children's song type is grouped into one group. In this case, a group Id of the group of the rock type, the pop type, and the rap type may be adult, and a group Id of the group of the children's song type may be child. According to the marking rule, it is easy to understand that if a song is of a rock type/pop type/rap type, a group mark of the song is G={adult}; and if a song is of a children's song type, the group mark of the song is D={child}.

Then, based on the dimension mark D and the group mark G, the following describes a possible implementation in which the server 300 calculates a difference $D_i$ between the song A and a song in the historical play record of the electronic device 100.

First, the server 100 may obtain all pre-stored historical play record of the electronic device 100, or a part of the pre-stored historical play record of the electronic device 100, for example, the historical play record of a recent period of time (for example, one month or two months), and calculate a difference $D_i$ of between the song A and each song in the all/part of historical play record.

For example, when a group mark G of the song A is the same as that of a song in the historical play record, a difference $D_i$ between the song A and the song may be calculated based on dimension marks D of the two songs.

Assuming that the dimension marks D of the two songs are $[x_0, y_0, z_0]$ and $[x_1, y_1, z_1]$ respectively, the difference Di between the two songs may be calculated by using the following formula 1:

$$D_i = \sqrt{(x_1 - x_0)^2 + (y_1 - y_0)^2 + (z_1 - z_0)^2} \quad \text{Formula 1}$$

It can be easily learned from the foregoing formula I that a larger value of the difference $D_i$ between the two songs indicates a larger difference between the two songs, and a smaller similarity.

For example, when the group mark G of the song A is different from that of a song in the historical play record, a difference $D_i$ between the song A and the song may be a preset fixed value. For example, the fixed value $D_i$ may be set to 100.

It is easy to understand that, when the group marks G of the two songs are different, the difference $D_i$ of the two songs is definitely large. Therefore, the preset fixed value of the difference $D_i$ may be a large value, and this value may be far greater than a maximum value of the difference $D_i$ calculated by using the foregoing formula 1 when the group marks D of the two songs are the same. For example, assuming that the maximum value of the difference $D_i$ calculated by using the foregoing formula 1 when the group marks D of the two songs are the same is 10, the preset fixed value of the difference $D_i$ may be 100.

Finally, a possible implementation in which the server 200 calculates the preference degree of the user for the song A based on the difference $D_i$ between the song A and each song in the historical play record of the electronic device 100 is described.

For example, after calculating the difference $D_i$ between the song A and each song in the historical play record of the electronic device 100, the server 300 may sort these calculated differences $D_i$ in ascending order, and calculate a distance value Dist by using all or some of these differences $D_i$ (for example, the first 20% differences $D_i$). The distance value Dist may be calculated by using the following Formula 2:

$$Dist = \frac{\sqrt{\sum_{i=1}^{N} D_i^2}}{N} \quad \text{Formula 2}$$

N is a total quantity of all songs in the historical play record (or a total quantity of some songs in the historical play record). A smaller distance value Dist (which may also be referred to as an average difference between the song A and the song in the historical play record) indicates a smaller difference between the song A and the song in the historical play record, a larger similarity, and a higher preference degree of the user for the song A.

Further, the server 300 may further preset a preference degree threshold. Assuming that the preset preference degree threshold is T, when the calculated distance value Dist is less than or equal to T, it may indicate that the user has a high preference degree for the song A, and it may further be determined that the song A is the song that the user of the electronic device 100 requests the electronic device 200 to play.

The following uses an example to describe a case in which the user has the high preference degree for the song A.

It is assumed that a dimension mark of the song A satisfies D1=[1, 1, 2], a group mark satisfies G1={adult}, there are five songs in the historical play record that is of the electronic device 100 and that is pre-stored by the server 300, dimension marks D of the five songs all satisfy D2=[1, 1, 5], group marks G all satisfy G2={adult}, and a preset preference degree threshold Tis 10. Because the group marks G1 and G2 are the same, differences $D_i$ need to be calculated based on the foregoing formula 1. It can be easily calculated that the differences $D_i$ between the song A and the five songs are all 3. Further, the differences $D_i$ are sorted in ascending order, and Dist may be calculated based on the foregoing formula 2 by using the first 20% differences $D_i$. It can be easily calculated that Dist=3. Because 3 is less than the preset preference degree threshold 10, it may be determined that the song A is the song that the user of the electronic device 100 requests to play.

After determining that the song A is the song that the user of the electronic device 100 requests the electronic device 200 to play, the server 300 may mark the song A as a play record of the electronic device 100. That is, the server 300 may store the song A in the historical play record of the electronic device 100, and may use the song A as the data source for subsequent content recommendation to the user of the electronic device 100 and obtain, through matching, the song of the same type as the song A.

S218: The server 300 sends the play information of the song A and the song of the same type as the song A to the electronic device 100.

The play information of the song A may include but is not limited to information such as a name of the song A and a name of a singer. There may be one or more songs of the same type as the song A.

In some embodiments, the server 300 may also send the historical play record of the electronic device 100, the play information of the song A, and the song of the same type as the song A to the electronic device 100 together.

It should be noted that step S218 may be actively performed by the server 300 after step S217 is performed, or may be performed after the electronic device 100 sends the request to the server 300 when the electronic device 100 needs to display a song play record and a song recommendation list. This is not limited in embodiments of this application.

S219: The electronic device 100 displays the song play record and the song recommendation list, where the song play record includes the song A, and the song recommendation list includes the song of the same type as the song A.

Figure 6A:
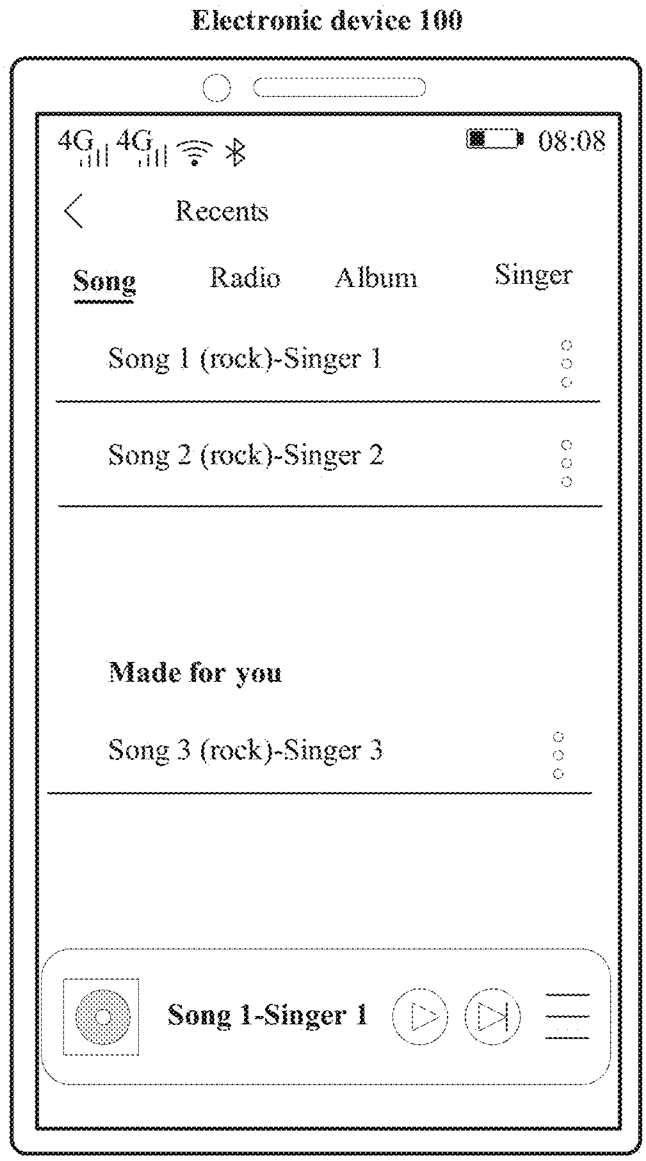
FIG. 6A to FIG. 6C are schematic diagrams of a group of user interfaces for displaying a song play record and a song recommendation list according to an embodiment of this application.

For example, before the electronic device 200 plays the song A, as shown in FIG. 6A, a user interface displayed on the electronic device 100 may be a recent play interface of the music APP. It can be learned that a record (that is, the historical play record) of songs that are recently played by the electronic device 100 includes two songs: a song 1 and a song 2. Both the two songs are rock songs. The song recommendation list (that is, "Made for you" in FIG. 6A) displayed on the electronic device 100 includes a song 3. The song 3 is also a rock song, and is of the same type as the songs in the record of songs that are recently played.

Figure 6B:
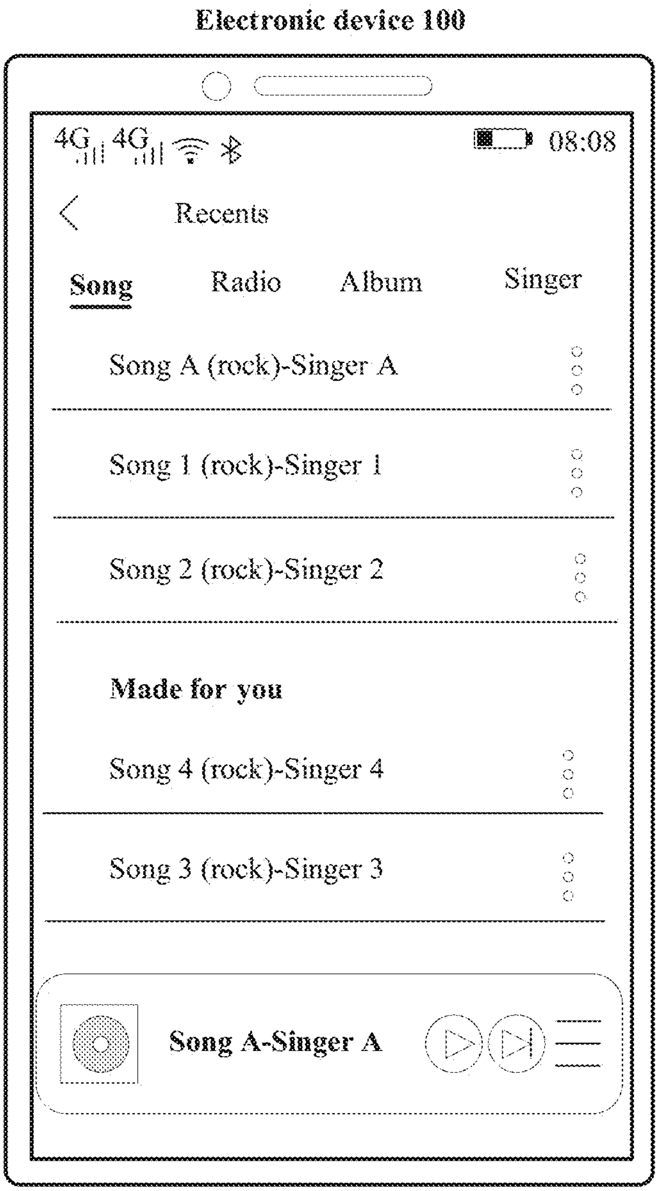

It is assumed that the song A is also a rock song. For example, after the electronic device 200 plays the song A, as shown in FIG. 6B, the user interface displayed on the electronic device 100 may be the recent play interface of the music APP. It can be learned that, different from FIG. 6A, the song A is newly added to the record of songs that are recently played by the electronic device 100, and a song 4 is newly added to the song recommendation list (that is, "Made for you" in FIG. 6B) displayed on the electronic device 100. The song 4 is also a rock song, and is of the same type as the song A.

According to the method provided in the embodiment shown in FIG. 2, whether the user that requests the electronic device 200 (that is, a smart home device such as a smart speaker) to play the song A is the user of the electronic device 100 (that is, a personal device such as a mobile phone) may be simply and accurately identified. If the user that requests the electronic device 200 to play the song A is the user of the electronic device 100, the song A may be stored in the historical play record of the electronic device 100, and the song A is used as the data source for subsequent content recommendation to the user of the electronic device 100. In this way, accuracy of content recommendation may be improved, and user experience may be improved. In addition, the electronic device 100 and the electronic device 200 do not need to be added with a function, and only the server 300 needs to be added with a function, so that development costs are low.

Still refer to FIG. 2. It can be learned that step S217 to step S219 in the embodiment shown in FIG. 2 describe a case in which the user has the high preference for the song A, that is, a case in which the user that requests the electronic device 200 (that is, the smart home device such as the smart sound box) to play the song A is the user of the electronic device 100 (that is, the personal device such as the mobile phone). A case in which the preference degree of the user for the song A is low, that is, a case in which the user that requests the electronic device 200 (that is, the smart home device such as the smart speaker) to play the song A is not the user of the electronic device 100 (that is, the personal device such as the mobile phone) but may be the another family member of the user of the electronic device 100 is described below with reference to FIG. 7.

Figure 7:
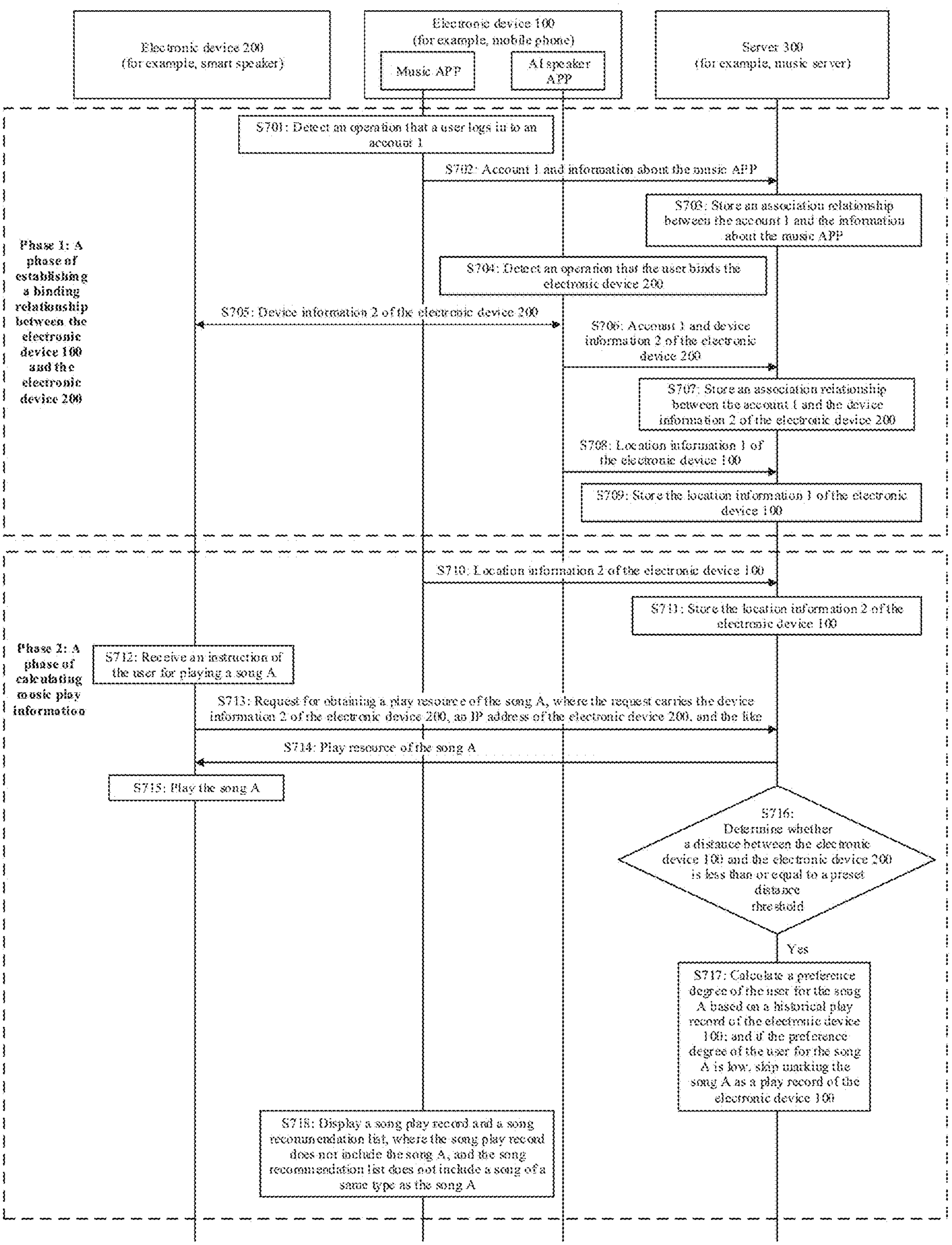
FIG. 7 is a schematic flowchart of another play record display method according to an embodiment of this application.

As shown in FIG. 7, step S701 to step S716 are all the same as step S201 to step S216 in the embodiment shown in FIG. 2. For a specific execution process of step S701 to step S716, refer to related content in the embodiment shown in FIG. 2. Details are not described herein again. Only step S717 and step S718 are different from step S217 to step S219 in the embodiment shown in FIG. 2.

The following describes only a specific execution process of step S717 and step S718 in FIG. 7 in detail.

S717: A server 300 calculates a preference degree of a user for a song A based on a historical play record of an electronic device 100; and if the preference degree of the user for the song A is low, the server 300 does not mark the song A as a play record of the electronic device 100.

For a process in which the server 300 calculates the preference degree of the user for the song A, refer to related content in step S217 in the embodiment shown in FIG. 2. Details are not described herein again.

The following uses an example to describe a case in which the user has the low preference degree for the song A.

It is assumed that a dimension mark of the song A satisfies D3=[1, 1, 2], a group mark satisfies G3={child}, there are five songs in the historical play record that is of the electronic device 100 that is pre-stored by the server 300, the dimension marks D of the five songs all satisfy D4=[1, 1, 5], the group marks G all satisfy G4={adult}, a preset preference degree threshold Tis 10, and a preset fixed value $D_i$ is 100. Because the group marks G3 and G4 are different, the differences $D_i$ do not need to be calculated based on the foregoing formula 1, but are the preset fixed value $D_i$. Therefore, the differences $D_i$ between the song A and the five songs may all be the preset fixed value 100. Further, the differences $D_i$ are sorted in ascending order, and Dist may be calculated based on the foregoing formula 2 by using the first 20% differences $D_i$. It can be easily calculated that Dist=100. Because 100 is greater than the preset preference degree threshold 10, it may be determined that the song A is not the song that the user of the electronic device 100 requests an electronic device 200 to play, but may be the song that the another family member of the user of the electronic device 100 requests the electronic device 200 to play.

In some embodiments, when a group mark G1 of the song A is different from a group mark G2 of each song in the historical play record, the server 300 may directly determine that the song A is not the song that the user of the electronic device 100 requests to play, and does not need to determine, after subsequent calculation of the difference $D_i$ and Dist, that the song A is not the song that the user of the electronic device 100 requests to play.

After determining that the song A is not the song that the user of the electronic device 100 requests the electronic device 200 to play, the server 300 may not mark the song A as the play record of the electronic device 100. That is, the server 300 may not store the song A in the historical play record of the electronic device 100, and does not use the song A as a data source for subsequent content recommendation to the user of the electronic device 100. In this way, if the song A is the song that another family member of the user of the electronic device 100 requests the electronic device 200 to play, this can prevent a song that is recommended to the another family member of the user of the electronic device 100 from being incorrectly recommended to the user of the electronic device 100 subsequently, and effect of content recommendation to the user of the electronic device 100 is not affected.

S718: The electronic device 100 displays a song play record and a song recommendation list, where the song play record does not include the song A, and the song recommendation list does not include a song of a same type as the song A.

For example, before the electronic device 200 plays the song A, as shown in FIG. 6A, a user interface displayed on the electronic device 100 may be a recent play interface of the music APP. It can be learned that a record (that is, the historical play record) of songs that are recently played by the electronic device 100 includes two songs: a song 1 and a song 2. Both the two songs are rock songs. The song recommendation list (that is, "Made for you" in FIG. 6A) displayed on the electronic device 100 includes a song 3. The song 3 is also a rock song, and is of the same type as the songs in the record of songs that are recently played.

It is assumed that the song A is a children's song. Because types of the children's song and the foregoing rock song are completely different, and a difference is great, after the electronic device 200 plays the song A, if the user enters the recent play interface of the music APP of the electronic device 100, the song play record and the song recommendation list displayed in the interface may be the same as those in FIG. 6A, the song play record does not include the song A, and the song recommendation list does not include the song of the same type as the song A.

In some embodiments, when a difference between the song A and the song in the record of songs that are recently played by the electronic device 100 is large, the song A may also be added to the record of songs that are recently played by the electronic device 100, but the song of the same type as the song A does not need to be added to the song recommendation list. In other words, the song play record includes the song A, but the song recommendation list does not include the song of the same type as the song A. In this way, recent play records on both the electronic device 100 and the electronic device 200 may be displayed for the user to view, and the effect of content recommendation to the user of the electronic device 100 is not affected.

Figure 6C:
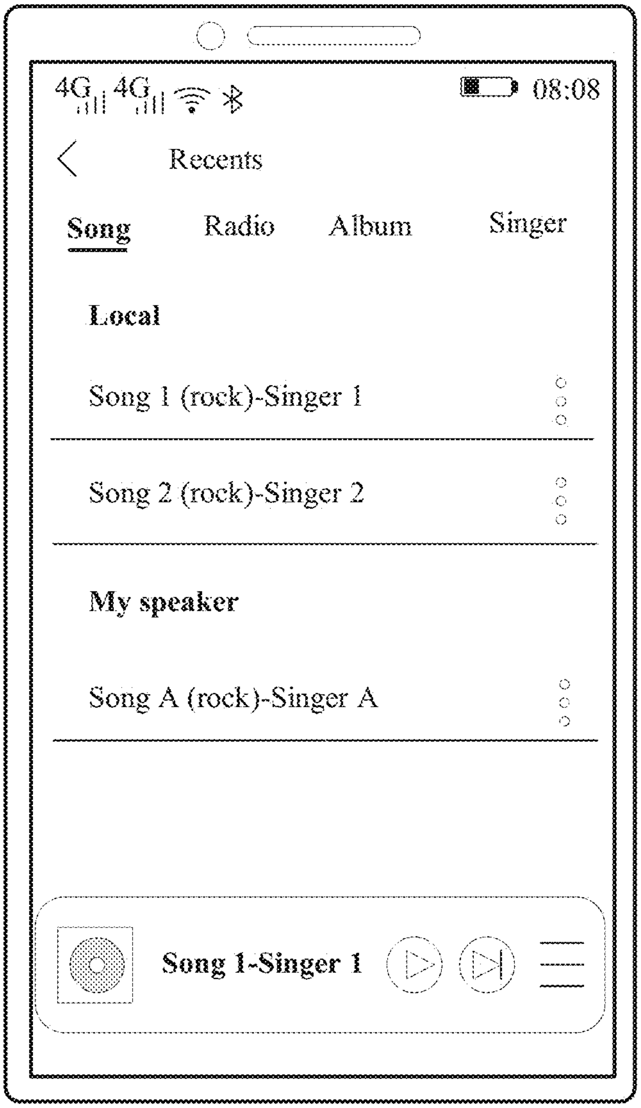

In some other embodiments, the electronic device 100 may differentially display the recent play record of the electronic device 100 and the recent play record of the electronic device 200. Refer to FIG. 6C. It is assumed that the electronic device 100 (that is, a local device) recently plays the song 1 and the song 2, and the electronic device 200 (that is, the smart speaker) recently plays the song A. In this case, the electronic device 100 may display the song 1 and the song 2 under an identifier "Local", and display the song A under an identifier "My speaker". In this way, the user can intuitively learn which songs are played on the local device and which songs are played on "My speaker", so that user experience is improved.

According to the method provided in the embodiment shown in FIG. 7, whether the user that requests the electronic device 200 (that is, the smart home device such as the smart speaker) to play the song A is the user of the electronic device 100 (that is, the personal device such as the mobile phone) may be simply and accurately identified. If the user that requests the electronic device 200 to play the song A is not the user of the electronic device 100, the song A is not stored in the historical play record of the electronic device 100, and the song A is not used as the data source for subsequent content recommendation to the user of the electronic device 100. In this way, if the song A is the song that the another family member of the user of the electronic device 100 requests the electronic device 200 to play, this can prevent the song that is recommended to the another family member of the user of the electronic device 100 from being incorrectly recommended to the user of the electronic device 100 subsequently, the effect of content recommendation to the user of the electronic device 100 is not affected, and user experience is improved. In addition, the electronic device 100 and the electronic device 200 do not need to be added with a function, and only the server 300 needs to be added with a function, so that development costs are low.

In the embodiments shown in FIG. 2, and FIG. 7, a process of determining whether the distance between the electronic device 100 and the electronic device 200 is less than or equal to the preset distance threshold (that is, determining whether the electronic device 100 is near the electronic device 200) is performed by the server 300. In some embodiments, this process may also be performed by the electronic device 200 (that is, the smart home device such as the smart speaker) or the electronic device 100 (that is, the personal device such as the mobile phone). The following separately provides examples for description.

Figure 8A:
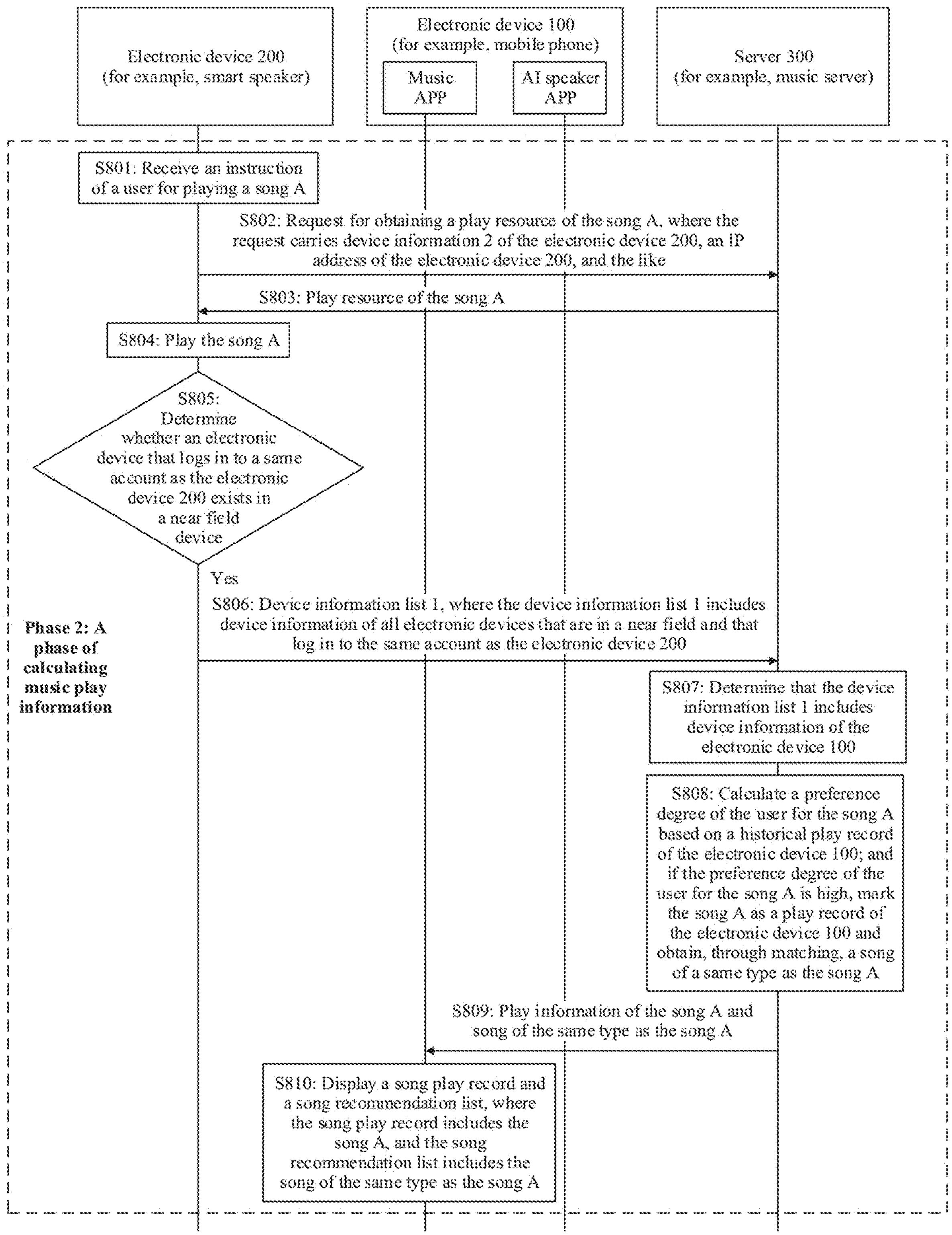
FIG. 8A is a schematic flowchart of determining, by using an electronic device 200 (that is, a smart home device such as a smart speaker), whether a distance between an electronic device 100 and the electronic device 200 is less than or equal to a preset distance threshold according to an embodiment of this application.

First, with reference to FIG. 8A, a possible implementation of determining, by using an electronic device 200 (that is, a smart home device such as a smart speaker), whether a distance between an electronic device 100 and the electronic device 200 is less than or equal to a preset distance threshold is described.

For a specific execution process of step S801 to step S804 and a specific execution process of step S808 to step S810, refer to related content in the embodiment shown in FIG. 2. Details are not described herein again. The following describes only a specific execution process of step S805 to step S807.

S805 and S806: The electronic device 200 determines whether an electronic device that logs in to a same account as the electronic device 200 exists in a near field device, and if the electronic device exists in the near field device, the electronic device 200 may send a device information list 1 to a server 300, where the device information list 1 includes device information of all electronic devices that are in a near field and that log in to the same account as the electronic device 200.

In an embodiment of this application, the electronic device 200 may detect the near field device by using Wi-Fi, or may detect the near field device by using another short-range wireless communication, for example, Bluetooth. A specifically used short-range communication manner is not limited in embodiments of this application. In some embodiments, whether there is another electronic device nearby may alternatively be determined by using a GPS. In an embodiment of this application, Wi-Fi detection is used as an example for description.

For example, the electronic device 200 may search for, by using Wi-Fi, a broadcast signal sent by a surrounding device, detect that a device that is connected to Wi-Fi whose SSID is the same as that of the Wi-Fi to which the electronic device 200 is connected is the near field device, and determine that the near field device is the device whose distance from the electronic device 200 is less than or equal to the preset distance threshold. Further, the electronic device 200 may obtain device information (such as a device identifier and a media access control address) of the near field device from the broadcast signal.

Further, the electronic device 200 may determine whether the electronic device that logs in to the same account as the electronic device 200 exists in the near field device. For example, the electronic device 200 may obtain, based on an association relationship between the account and the device information, device information of another electronic device that logs in to the same account as the electronic device 200. If the device information of the near field device includes device information of one or more other electronic devices (for example, the electronic device 100) that log in to the same account as the electronic device 200, the electronic device 200 may determine that the another electronic device that logs in to the same account as the electronic device 200 exists in the near field device. The association relationship between the account and the device information may be obtained by the electronic device 200 from the server 300

Further, after the electronic device 200 determines that the another electronic device that logs in to the same account as the electronic device 200 exists in the near field device, the electronic device 200 may send the device information list 1 to the server 300, where the device information list 1 includes the device information of all electronic devices that are in the near field and that log in to the same account as the electronic device 200.

It should be noted that an occasion for performing step S805 is not limited in embodiments of this application. For example, step S805 may be performed after step S801, or may be performed after step S802/step S803/step S804.

S807: The server 300 determines that the device information list 1 includes device information of the electronic device 100.

Specifically, after receiving the device information list 1 sent by the electronic device 200, the server 300 may determine whether the device information list 1 includes the device information of the electronic device 100. If the device information list 1 includes the device information of the electronic device 100, the server 300 may continue to perform step S808. If the device information list 1 does not include the device information of the electronic device 100, the server 300 may determine that the song A does not need to be stored as a historical play record of a personal device (for example, the electronic device 100) of the user, and the song A does not need to be used as a data source for subsequent content recommendation to the personal device of the user.

Optionally, before the server 300 performs step S808, the method further includes: The server 300 determines, based on the previously stored association relationship between the account and the device information, that the device information of the another electronic device that logs in to the same account as the electronic device 200 includes the device information of the electronic device 100.

In some embodiments, the electronic device 200 may obtain only the device information of the near field device, and send the device information of the near field device to the server 300. After receiving the device information of the near field device, the server 300 may further determine, based on the device information of the near field device and the previously stored association relationship between the account and the device information, whether the device information of the another electronic device, for example, the device information of the electronic device 100, that logs in to the same account as the electronic device 200 exists in the device information of the near field device. If the device information of the another electronic device exists in the device information of the near field device, the server 300 then performs step S808. If the device information of the another electronic device does not exist in the device information of the near field device, the server 300 may determine that the song A does not need to be stored as the historical play record of the personal device (for example, the electronic device 100) of the user, and the song A does not need to be used as the data source for subsequent content recommendation to the personal device of the user.

In some embodiments, in step S806, the device information list 1 may not be sent, and indication information indicating that the electronic device 200 is close to an electronic device or some electronic devices may be sent, for example, indication information indicating that the electronic device 200 is close to the electronic device 100. Then, the server 300 does not need to determine the distance between the electronic device 200 and the electronic device 100, and directly determines, in step S807 and based on the indication information, whether to perform a subsequent step. For example, if the server 300 determines, based on the indication information, that the electronic device 100 is close to the electronic device 200, step S808 continues to be performed.

It is easy to understand that step S801 to step S807 shown in FIG. 8A may replace step S210 to step S216 shown in FIG. 2 or step S710 to step S716 shown in FIG. 7.

Figure 8B:
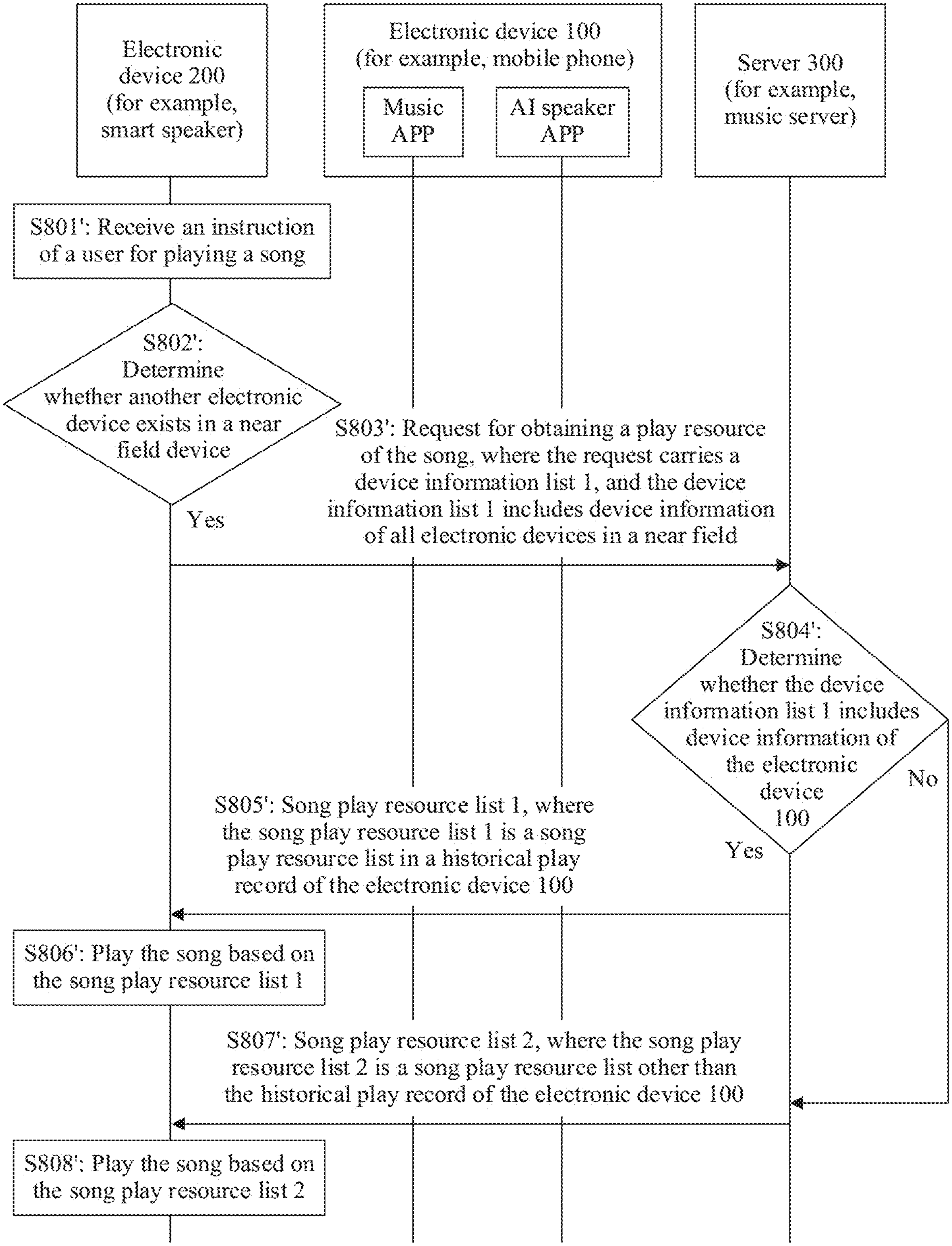
FIG. 8B is a schematic flowchart of playing a song by an electronic device 200 according to an embodiment of this application.

FIG. 8B is a schematic flowchart of playing a song by an electronic device 200 according to an embodiment of this application.

The procedure may be used in a scenario in which a user indicates the electronic device 200 to play a song, but does not explicitly indicate a song to be played. Before the procedure is performed, the electronic device 200 needs to establish a binding relationship with an electronic device 100. A specific process is consistent with steps in Phase 1 in the embodiment shown in FIG. 2. Details are not described herein again.

The following describes a process in which the electronic device 200 plays a song.

S801': The electronic device 200 receives an instruction of the user for playing a song.

The instruction may be a voice instruction initiated by the user, for example, "Hey Celia, play a song".

In an embodiment of this application, the instruction does not explicitly indicate a song that the user wants the electronic device 200 to play.

S802' and S803': The electronic device 200 determines whether another electronic device exists in a near field device, and if the another electronic device exists in the near field device, the electronic device 200 may send, to a server 300, a request for obtaining a play resource of the song, where the request carries a device information list 1, and the device information list 1 includes device information of all electronic devices in the near field.

In an embodiment of this application, the electronic device 200 may detect the near field device by using Wi-Fi, or may detect the near field device by using another short-range wireless communication, for example, Bluetooth. A specifically used short-range communication manner is not limited in embodiments of this application. In some embodiments, whether there is another electronic device nearby may alternatively be determined by using a GPS. In an embodiment of this application, Wi-Fi detection is used as an example for description. For example, the electronic device 200 may search for, by using Wi-Fi, the broadcast signal sent by the surrounding device, detect that the device that is connected to Wi-Fi whose SSID is the same as that of the Wi-Fi to which the electronic device 200 is connected is the near field device, and determine that the near field device is the device whose distance from the electronic device 200 is less than or equal to a preset distance threshold. Further, the electronic device 200 may obtain the device information (such as a device identifier and a media access control address) of the near field device from the broadcast signal.

Further, after obtaining the device information of the near field device, the electronic device 200 may send, to the server 300, the request for obtaining the play resource of the song, where the request carries the device information list 1, and the device information list 1 includes the device information of all electronic devices in the near field.

S804': The server 300 determines whether the device information list 1 includes device information of the electronic device 100.

Specifically, after receiving the device information list 1, the server 300 may determine whether the device information list 1 includes the device information of the electronic device 100. If the device information list 1 includes the device information of the electronic device 100, it indicates that a distance between the electronic device 200 and the electronic device 100 is less than or equal to the preset distance threshold, and the server 300 may continue to perform step S805'. If the device information list 1 does not include the device information of the electronic device 100, it indicates that the distance between the electronic device 200 and the electronic device 100 is greater than the preset distance threshold, and the server 300 may continue to perform step S807'.

S805' and S806': If the server 300 determines that the device information list 1 includes the device information of the electronic device 100, the server 300 may send a song play resource list 1 to the electronic device 200, where the song play resource list 1 is a song play resource list in a historical play record of the electronic device 100; and after receiving the song play resource list 1, the electronic device 200 may play the song based on the song play resource list 1.

To be specific, when the distance between the electronic device 200 and the electronic device 100 is less than or equal to the preset distance threshold, it is very likely that the user that initiates a song play instruction is the user of the electronic device 100. In this case, the electronic device 200 may play a song in the historical play record of the electronic device 100. In this way, it is more likely that the song played by the electronic device 200 is the song that the user prefers to listen to, and user experience is improved.

S807' and S808': If the server 300 determines that the device information list 1 does not include the device information of the electronic device 100, the server 300 may send a song play resource list 2 to the electronic device 200, where the song play resource list 2 is a song play resource list other than the historical play record of the electronic device 100; and after receiving the song play resource list 2, the electronic device 200 may play the song based on the song play resource list 2.

To be specific, when the distance between the electronic device 200 and the electronic device 100 is greater than the preset distance threshold, it is very likely that the user that initiates the song play instruction is not the user of the electronic device 100. In this case, the electronic device 200 may play a song other than the historical play record of the electronic device 100. For example, the electronic device 200 may play a song in historical play records of all other electronic devices that establish a binding relationship with or establish a communication connection to the electronic device 200. Alternatively, the electronic device 200 may play a song with a large recent play amount, a classic pop song, or the like. In this way, it is more likely that the song played by the electronic device 200 is the song that the user prefers to listen to, and user experience is improved.

Figure 8C:
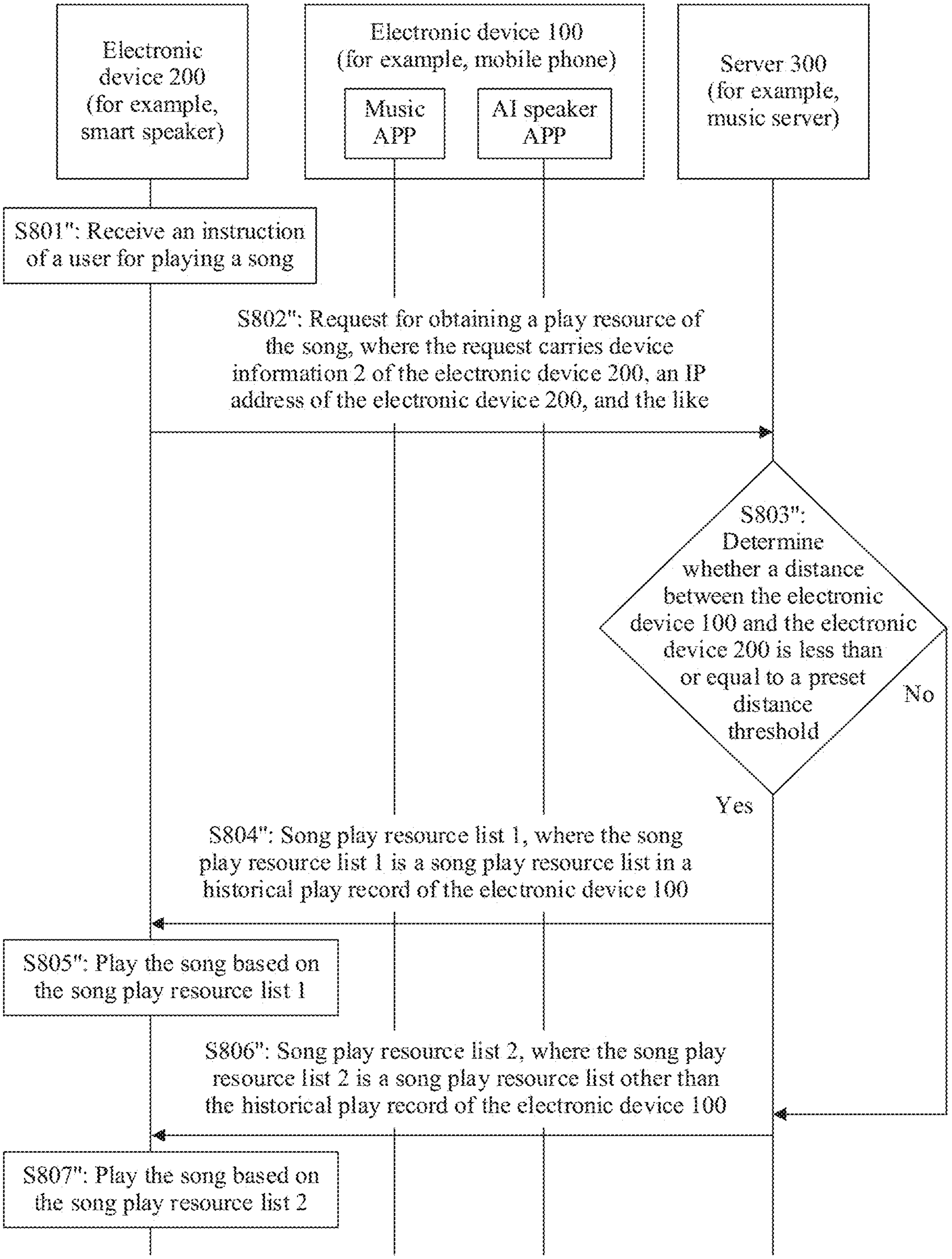
FIG. 8C is another schematic flowchart of playing a song by an electronic device 200 according to an embodiment of this application.

FIG. 8C is another schematic flowchart of playing a song by an electronic device 200 according to an embodiment of this application.

The procedure may be used in a scenario in which a user indicates the electronic device 200 to play a song, but does not explicitly indicate a song to be played. Before the procedure is performed, the electronic device 200 needs to establish a binding relationship with an electronic device 100, and the electronic device 100 may periodically report location information to a server 300. A specific process is similar to steps (step S201 to step S209) in Phase 1 and step S210 and step S211 in Phase 2 in the embodiment shown in FIG. 2. Details are not described herein again.

The following describes a process in which the electronic device 200 plays a song. S801": The electronic device 200 receives an instruction of the user for playing a song.

The instruction may be a voice instruction initiated by the user, for example, "Hey Celia, play a song".

In an embodiment of this application, the instruction does not explicitly indicate a song that the user wants the electronic device 200 to play.

S802"; The electronic device 200 sends a request for obtaining a play resource of the song to the server 300, where the request carries device information 2 of the electronic device 200, an IP address of the electronic device 200, and the like.

For a specific execution process of step S802", refer to related content in step S213 in the embodiment shown in FIG. 2. Details are not described herein again.

S803": The server 300 determines whether a distance between the electronic device 100 and the electronic device 200 is less than or equal to a preset distance threshold.

For a specific execution process of step S803", refer to related content in step S216 in the embodiment shown in FIG. 2. Details are not described herein again.

S804" and S805": If the server 300 determines that the distance between the electronic device 200 and the electronic device 100 is less than or equal to the preset distance threshold, the server 300 may send a song play resource list 1 to the electronic device 200, where the song play resource list 1 is a song play resource list in a historical play record of the electronic device 100; and after receiving the song play resource list 1, the electronic device 200 may play the song based on the song play resource list 1.

To be specific, when the distance between the electronic device 200 and the electronic device 100 is less than or equal to the preset distance threshold, it is very likely that the user that initiates a song play instruction is the user of the electronic device 100. In this case, the electronic device 200 may play a song in the historical play record of the electronic device 100. In this way, it is more likely that the song played by the electronic device 200 is the song that the user prefers to listen to, and user experience is improved.

S806" and S807": If the server 300 determines that the distance between the electronic device 200 and the electronic device 100 is greater than the preset distance threshold, the server 300 may send a song play resource list 2 to the electronic device 200, where the song play resource list 2 is a song play resource list other than the historical play record of the electronic device 100; and after receiving the song play resource list 2, the electronic device 200 may play the song based on the song play resource list 2.

To be specific, when the distance between the electronic device 200 and the electronic device 100 is greater than the preset distance threshold, it is very likely that the user that initiates the song play instruction is not the user of the electronic device 100. In this case, the electronic device 200 may play a song other than the historical play record of the electronic device 100. For example, the electronic device 200 may play a song in historical play records of all other electronic devices that establish a binding relationship with or establish a communication connection to the electronic device 200. Alternatively, the electronic device 200 may play a song with a large recent play amount, a classic pop song, or the like. In this way, it is more likely that the song played by the electronic device 200 is the song that the user prefers to listen to, and user experience is improved.

Figure 9:
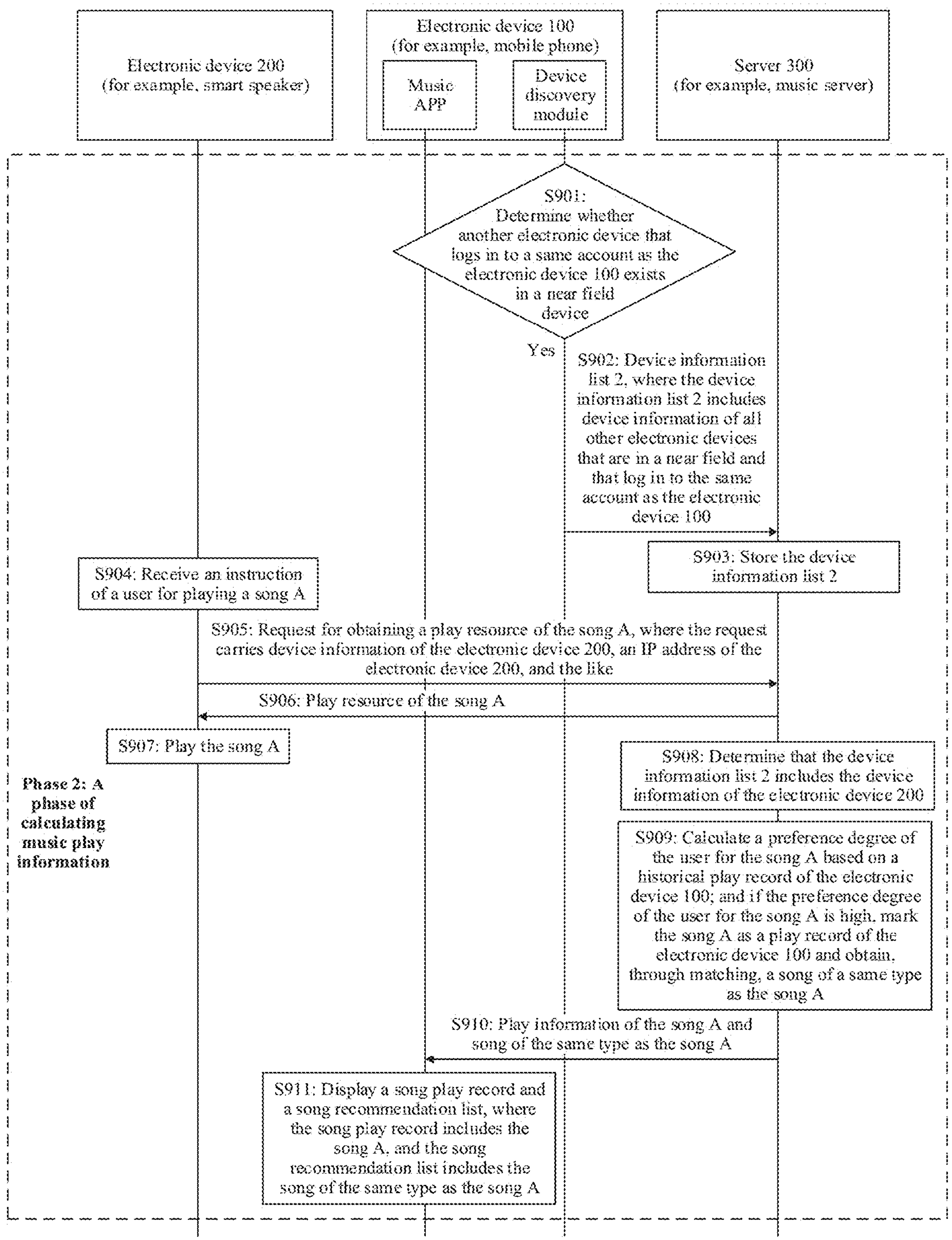
FIG. 9 is a schematic flowchart of determining, by using an electronic device 100 (that is, a personal device such as a mobile phone), whether a distance between the electronic device 100 and an electronic device 200 is less than or equal to a preset distance threshold according to an embodiment of this application.

With reference to FIG. 9, the following describes a possible implementation of determining, by using an electronic device 100 (that is, a personal device such as a mobile phone), whether a distance between the electronic device 100 and an electronic device 200 is less than or equal to a preset distance threshold.

For a specific execution process of step S904 to step S907 and a specific execution process of step S909 to step S911, refer to related content in the embodiment shown in FIG. 2. Details are not described herein again. The following describes only a specific execution process of step S901 to step S903 and a specific execution process of step S908.

S901 to S903: The electronic device 100 determines whether another electronic device that logs in to a same account as the electronic device 100 exists in a near field device, and if the another electronic device exists in the near field device, the electronic device 100 may send a device information list 2 to a server 300, where the device information list 2 includes device information of all electronic devices that are in the near field and that log in to the same account as the electronic device 100.

In an embodiment of this application, step S901 to step S903 may be periodically performed, and an execution periodicity may be 0.5 minutes, 1 minute, 2 minutes, or the like. This is not limited in embodiments of this application.

In an embodiment of this application, the server 300 may store only a device information list (for example, a device information list 2) that is sent by the electronic device 100 most recently.

In an embodiment of this application, the electronic device 100 may implement a function of detecting the near field device by using a device discovery module (for example, a Wi-Fi module or a Bluetooth module).

The electronic device 100 may detect the near field device by using Wi-Fi, or may detect the near field device by using another short-range wireless communication, for example, Bluetooth. A specifically used short-range communication manner is not limited in embodiments of this application. In an embodiment of this application, Wi-Fi detection is used as an example for description.

For example, the electronic device 100 may search for, by using Wi-Fi, a broadcast signal sent by a surrounding device, detect that a device that is connected to Wi-Fi whose SSID is the same as that of the Wi-Fi to which the electronic device 100 is connected is the near field device, and determine that the near field device is the device whose distance from the electronic device 100 is less than or equal to the preset distance threshold. Further, the electronic device 100 may obtain device information (such as a device identifier and a media access control address) of the near field device from the broadcast signal.

Further, the electronic device 100 may determine whether an electronic device that logs in to the same account as the electronic device 100 exists in the near field device. For example, the electronic device 100 may obtain, based on an association relationship between an account and the device information, device information of another electronic device that logs in to the same account as the electronic device 100. If the device information of the near field device includes device information of one or more other electronic devices (for example, the electronic device 200) that log in to the same account as the electronic device 100, the electronic device 100 may determine that the another electronic device that logs in to the same account as the electronic device 100 exists in the near field device. The association relationship between the account and the device information may be obtained by the electronic device 100 from the server 300.

Further, after the electronic device 100 determines that the another electronic device that logs in to the same account as the electronic device 100 exists in the near field device, the electronic device 100 may send the device information list 2 to the server 300, where the device information list 2 includes the device information of all electronic devices that are in the near field and that log in to the same account as the electronic device 100.

Further, the server 300 may store the device information list 2.

S908: The server 300 determines that the device information list 2 includes device information of the electronic device 200.

It is easy to understand that execution of step S908 is triggered by step S905.

Specifically, after receiving a request, sent by the electronic device 200, for obtaining a play resource of a song A, the server 300 may determine, based on the device information of the electronic device 200 carried in the request and the previously stored device information list 2, whether the device information list 2 includes the device information of the electronic device 200. If the device information list 2 includes the device information of the electronic device 200, the server 300 may continue to perform step S909. If the device information list 2 does not include the device information of the electronic device 200, the server 300 does not need to store the song A as a historical play record of a personal device (for example, the electronic device 100) of the user, and the song A does not need to be used as a data source for subsequent content recommendation to the personal device of the user.

The device information list 2 is a device information list that is stored by the server 300 most recently and that is sent by the electronic device 100.

In some embodiments, the electronic device 100 may obtain only the device information of the near field device, and periodically send the device information of the near field device to the server 300, and the server 300 stores the device information of the near field device. When execution of step S908 is triggered, the server 300 may further determine, based on the device information of the near field device that is stored most recently and that is sent by the electronic device 100 and the previously stored association relationship between the account and the device information, whether the device information of the another electronic device, for example, the device information of the electronic device 200, that logs in to the same account as the electronic device 100 exists in the device information of the near field device. If the device information of the another electronic device exists in the device information of the near field device, the server 300 then performs step S909. If the device information of the another electronic device does not exist in the device information of the near field device, the server 300 may determine that the song A does not need to be stored as the historical play record of the personal device (for example, the electronic device 100) of the user, and the song A does not need to be used as the data source for subsequent content recommendation to the personal device of the user.

In some embodiments, in step S902 and step S903, the device information list 2 may not be sent and stored, and indication information indicating that the electronic device 100 is close to an electronic device or some electronic devices may be sent and stored, for example, indication information indicating that the electronic device 100 is close to the electronic device 200. Then, the server 300 does not need to determine the distance between the electronic device 200 and the electronic device 100, and directly determines, in step S908 based on the indication information, whether to perform a subsequent step. For example, if the server 300 determines, based on the indication information, that the electronic device 100 is close to the electronic device 200, step S909 continues to be performed.

It is easy to understand that step S901 to step S908 shown in FIG. 9 may replace step S210 to step S216 shown in FIG. 2 or step S710 to step S716 shown in FIG. 7.

It is easy to understand that in the embodiments shown in FIG. 8A, FIG. 8B, and FIG. 9, when the electronic device 200 (for example, a smart speaker) or the electronic device 100 (for example, a mobile phone) determines whether the distance between the electronic device 100 and the electronic device 200 is less than or equal to the preset distance threshold (that is, determines whether the electronic device 100 is near the electronic device 200), step S208 and step S209 shown in FIG. 2 and step S708 and step S709 shown in FIG. 7 do not need to be performed.

It should be noted that the play record display method according to an embodiment of this application is described only by using a case in which the user requests the smart speaker to play a song (that is, play data is music data) as an example, and is not limited thereto. The play record display method according to an embodiment of this application is also applicable to another case, for example, a case in which the user requests a smart screen to play a video (that is, the play data is video data).

In an embodiment of this application, a first electronic device may be the electronic device 100. A second electronic device may be the electronic device 200. A server may be the server 300, a first account may be an account 1. A first historical play record may be the historical play record shown in FIG. 6A. A first song may be the song A played by the electronic device 200 in FIG. 2. A first message may be a message sent in step S218 in FIG. 2, may include play information of the song A, and may further include information about a song of a same type as the song A. A second message may be a message sent in step S213 in FIG. 2 (that is, the request for obtaining the play resource of the song A). A second historical play record may be the historical play record shown in FIG. 6B. A first preset threshold may be the preset distance threshold. A second song may be the song A played by the electronic device 200 in FIG. 7. A third message is a message sent in step S713 in FIG. 7 (that is, the request for obtaining the play resource of the song A). A third historical play record may be the historical play record shown in FIG. 6A. First location information may be the location information 2 of the electronic device 100. First reference location information may be the location information 1 of the electronic device 100. A fourth message may be the device information list 2 in FIG. 9. A fifth message may be the device information list 1 in FIG. 8A. A second preset threshold may be the preset preference degree threshold. Song category information may be a group mark G of a song.

The following describes a possible collaborative manner between internal modules of an electronic device 100 and a server 300 and between the internal modules in a process of performing a play record display method according to an embodiment of this application.

Figure 10:
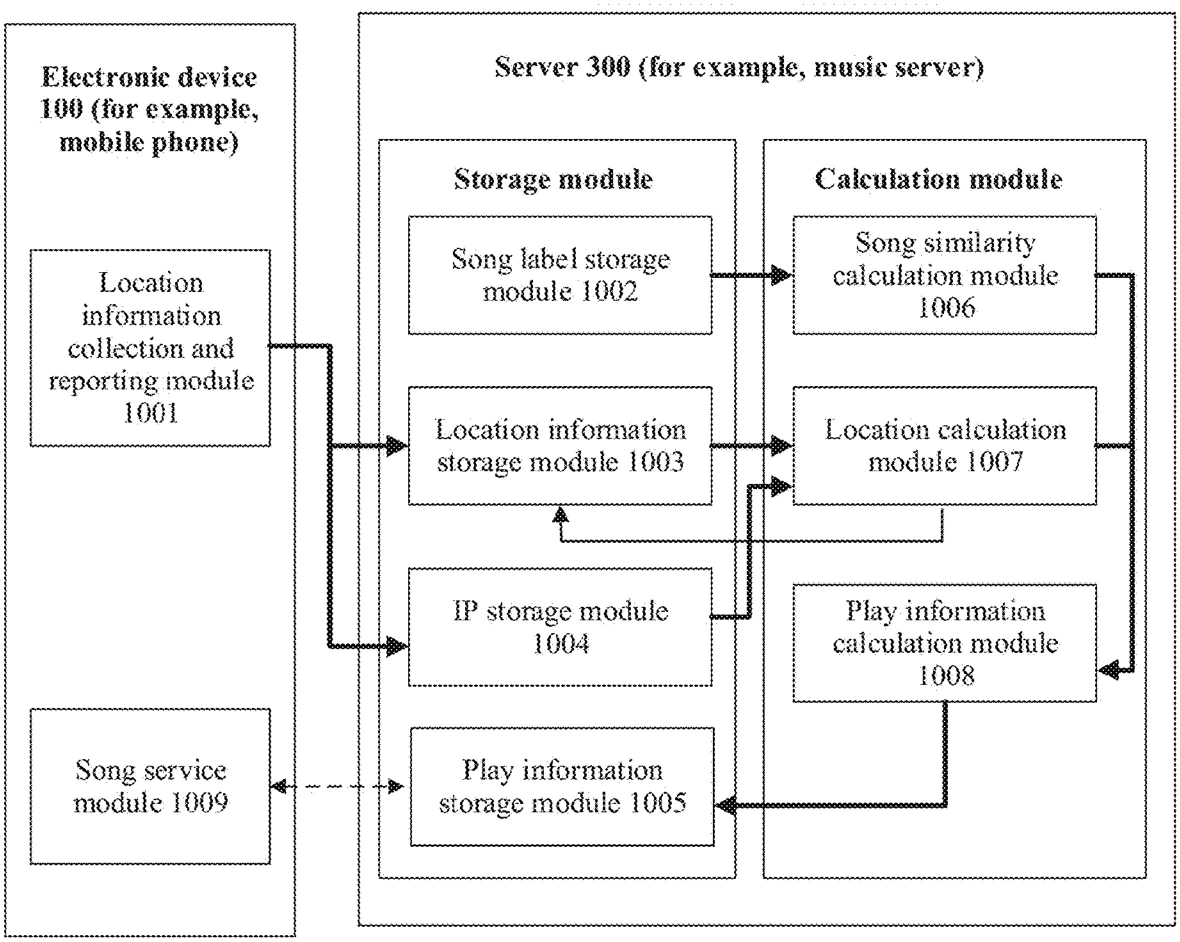
FIG. 10 is a schematic diagram of a possible collaborative manner between internal modules of an electronic device 100 and a server 300 in a process of performing a play record display method according to an embodiment of this application.

FIG. 10 shows an example of a possible collaborative manner between internal modules of an electronic device 100 and a server 300 and between the internal modules in a process of performing a play record display method according to an embodiment of this application.

As shown in FIG. 10, the electronic device 100 may include a location information collection and reporting module 1001, a song service module 1009, and the like. The server 300 may include a storage module, a calculation module, and the like. The storage module may include a song label storage module 1002, a location information storage module 1003, an IP storage module 1004, and a play information storage module 1005. The calculation module may include a song similarity calculation module 1006, a location calculation module 1007, and a play information calculation module 1008.

The location information collection and reporting module 1001 may be configured to collect location information (for example, location information collected in an account binding process and location information periodically collected after account binding is completed) of the electronic device 100, and report collected location information to the server 300.

The song label storage module 1002 may be configured to store label information, for example, a dimension label D, a group label G, and the like, of each song on the server 300.

The location information storage module 1003 may be configured to store the location information (for example, the location information reported in the account binding process and the location information periodically reported after account binding is completed) reported by the electronic device 100.

The IP storage module 1004 may be configured to store an IP address of the electronic device 100, where the IP address of the electronic device 100 may be obtained by the server 300 when the electronic device 100 reports the location information to the server 300, and may be further configured to store an IP address of an electronic device 200.

The play information storage module 1005 may be configured to store a historical play record of a user of the electronic device 100. The historical play record may include a play record of the user on the electronic device 100 and a play record on the electronic device 200. The play record on the electronic device 200 means that the server 300 determines that the play record is a record that the user of the electronic device 100 requests the electronic device 200 to play.

The song similarity calculation module 1006 may be configured to: calculate a similarity between a song that the user requests the electronic device 200 to play and each song in the historical play record of the electronic device 100, determine, based on the similarity, a preference degree of the user for the song that the user requests the electronic device 200 to play, and send a song preference degree calculation result (which may also be referred to as a song similarity calculation result) to the play information calculation module 1008. The similarity may be measured by using the foregoing difference $D_i$, and the difference $D_i$ may be calculated by using the song label information stored in the song label storage module 1002. For details, refer to related content in the foregoing embodiments. Details are not described herein again.

The location calculation module 1007 may be configured to: calculate a distance between the electronic device 100 and the electronic device 200, determine whether the electronic device 100 is near the electronic device 200, and send a location calculation result (that is, a decision result of determining whether the electronic device 100 is near the electronic device 200) to the play information calculation module 1008. The distance between the electronic device 100 and the electronic device 200 may be calculated based on the location information of the electronic device 100 stored in the location information storage module 1003, or may be calculated based on the IP address of the electronic device 100 and the IP address of the electronic device 200 that are stored in the IP storage module 1004. When it is determined that the electronic device 100 is near the electronic device 200, the location calculation module 1007 may be further configured to send current location information of the electronic device 100 to the location information storage module 1003.

The play information calculation module 1008 may be configured to determine, based on the song similarity calculation result sent by the song similarity calculation module 1006 and the location calculation result sent by the location calculation module 1007, whether a user that requests the electronic device 200 to play the song is the user of the electronic device 100. When it is determined that the user that requests the electronic device 200 to play the song is the user of the electronic device 100, the play information calculation module 1008 may be further configured to send play information of the song that the user requests the electronic device 200 to play this time to the play information storage module 1005.

The song service module 1009 may be configured to obtain the historical play record of the user of the electronic device 100. For example, the song service module 1009 may send a request for obtaining the historical play record of the user of the electronic device 100 to the play information storage module 1005. After receiving the request, the play information storage module 1005 may send the historical play record of the user of the electronic device 100 to the song service module 1009. The song service module 1009 may receive and store the historical play record of the user of the electronic device 100, to support the user to view the historical play record.

The electronic device 200 may further include a receiving module (not shown in the figure). The receiving module may be configured to receive a request of the electronic device 200 (for example, a request of the electronic device 200 for obtaining the play resource of the song A in the embodiment shown in FIG. 2), and may be further configured to: after receiving the request of the electronic device 200 for obtaining a play resource of a song, trigger the song similarity calculation module 1006 to perform song similarity calculation, and trigger the location calculation module 1007 to perform location calculation.

The electronic device 100 may further include a device discovery module (not shown in the figure). The device discovery module may be configured to: be responsible for mutual discovery of nearby devices, establish a short-range communication connection between different electronic devices, and receive and/or send a related instruction, request, and the like. In an embodiment of this application, the device discovery module may be a Wi-Fi module, a Bluetooth module, or the like.

For more details about functions of the internal modules of the electronic device 100 and the server 300, refer to related content in the foregoing embodiments. Details are not described herein again.

It may be understood that a structure shown in FIG. 10 does not constitute a specific limitation on the electronic device 100 and the electronic device 200. In some other embodiments of this application, the electronic device 100 and the electronic device 200 may have more or fewer components than those shown in FIG. 10, may combine two or more components, or may have different component configurations. Various components shown in the figure may be implemented in hardware including one or more signal processing and/or application-specific integrated circuits, software, or a combination of hardware and software.

The following describes a structure of an electronic device 100 according to an embodiment of this application.

Figure 11:
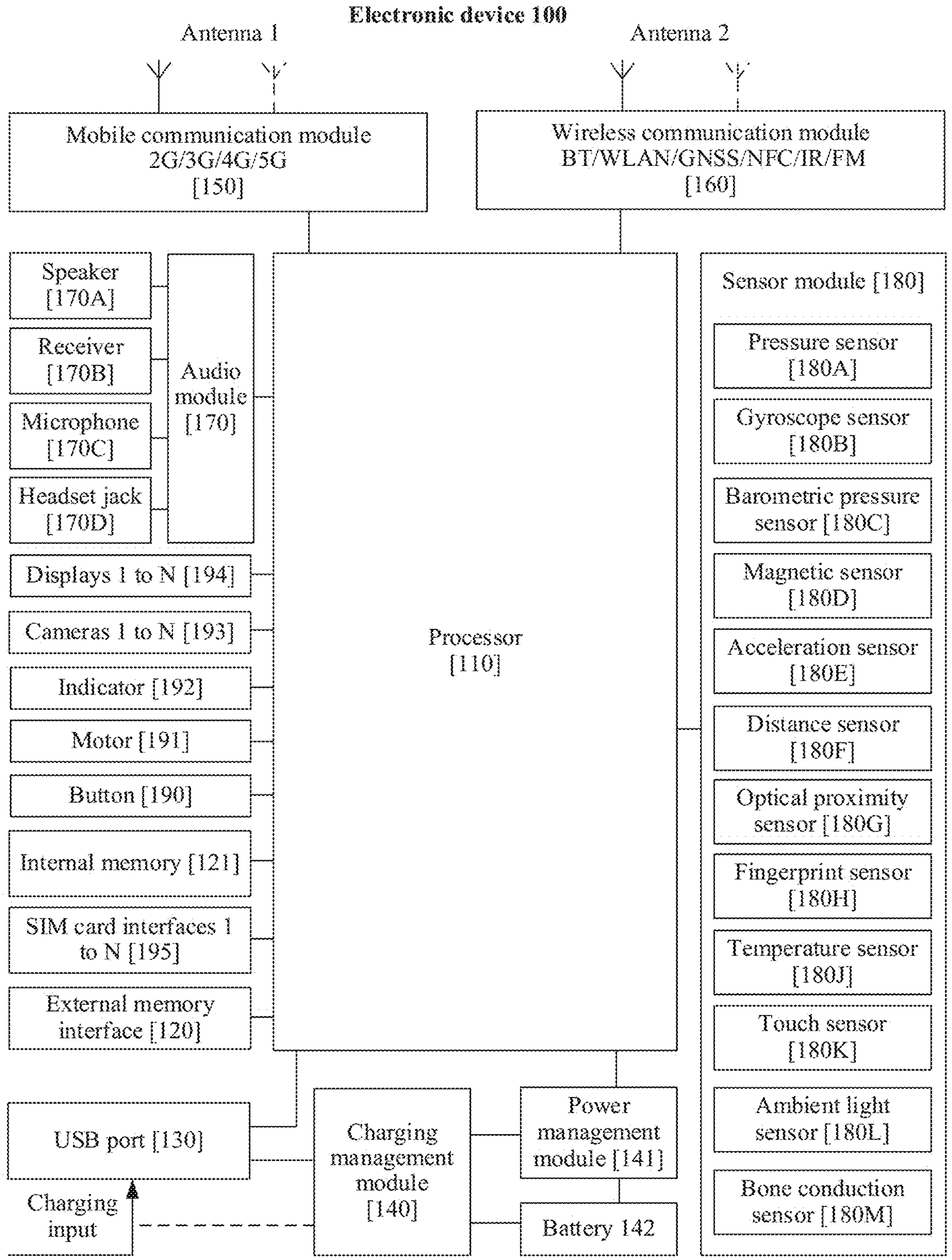
FIG. 11 is a schematic diagram of a structure of an electronic device 100 according to an embodiment of this application.

FIG. 11 shows an example of a structure of an electronic device 100 according to an embodiment of this application.

As shown in FIG. 11, an electronic device 100 may include: a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in an embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store instructions or data that has been recently used or cyclically used by the processor 110. If the processor 110 needs to use the instructions or the data again, the processor 110 may directly invoke the instructions or the data from the memory. This avoids repeated access, and reduces a waiting time of the processor 110, so that efficiency of a system is improved.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit the audio signal to the wireless communication module 160 through the PCM interface, to implement the function of answering a call by using the Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit the audio signal to the wireless communication module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI, or the like.

The USB port 130 is a port that conforms to a USB standard specification, and may be specifically a mini USB port, a micro USB port, a USB type-C port, or the like. The USB port 130 may be configured to be connected to the charger to charge the electronic device 100, may be configured to transmit data between the electronic device 100 and the peripheral device, or may be configured to be connected to a headset for playing audio through the headset. The port may alternatively be configured to be connected to another terminal device, for example, an AR device.

It may be understood that an interface connection relationship between the modules shown in an embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive the charging input from the wired charger through the USB port 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to be connected to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance).

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna I may be multiplexed as a diversity antenna of a wireless local area network. In some other embodiments, the antennas may be used in combination with a tuning switch.

The mobile communication module 150 may provide a solution, applied to the electronic device 100, to wireless communication including 2G, 3G, 4G, 5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into the low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution, applied to the electronic device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near-field communication (near-field communication, NFC) technology, an infrared (infrared, IR) technology, and the like. The wireless communication module 160 may be one or more devices integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 may communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements the display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may be made of a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement the photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into an image visible to naked eyes. The ISP may further perform algorithm optimization on noise, brightness, and the like of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, and the like.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the electronic device 100, for example, image recognition, facial recognition, speech recognition, and text understanding, may be implemented by using the NPU.

The external memory interface 120 may be configured to be connected to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various functional applications and data processing of the electronic device 100. The internal memory 121 may include a program storage area and a data storage area. The program storage area may store an operating system, an application required by at least one function (such as a voice playing function and an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory, and a universal flash storage (universal flash storage, UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or voice information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to be connected to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the electronic device 100. In some embodiments, angular velocities of the electronic device 100 around three axes (namely, x, y, and z axes) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a flip phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device 100, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats the battery 142 to prevent the electronic device 100 from being abnormally shut down due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

It should be understood that the electronic device 100 shown in FIG. 11 is merely an example, and the electronic device 100 may have more or fewer components than those shown in FIG. 11, or may combine two or more components, or may have different component configurations. Various components shown in FIG. 11 may be implemented in hardware including one or more signal processing and/or application-specific integrated circuits, software, or a combination of hardware and software.

The following describes a software structure of an electronic device 100 according to an embodiment of this application.

Figure 12:
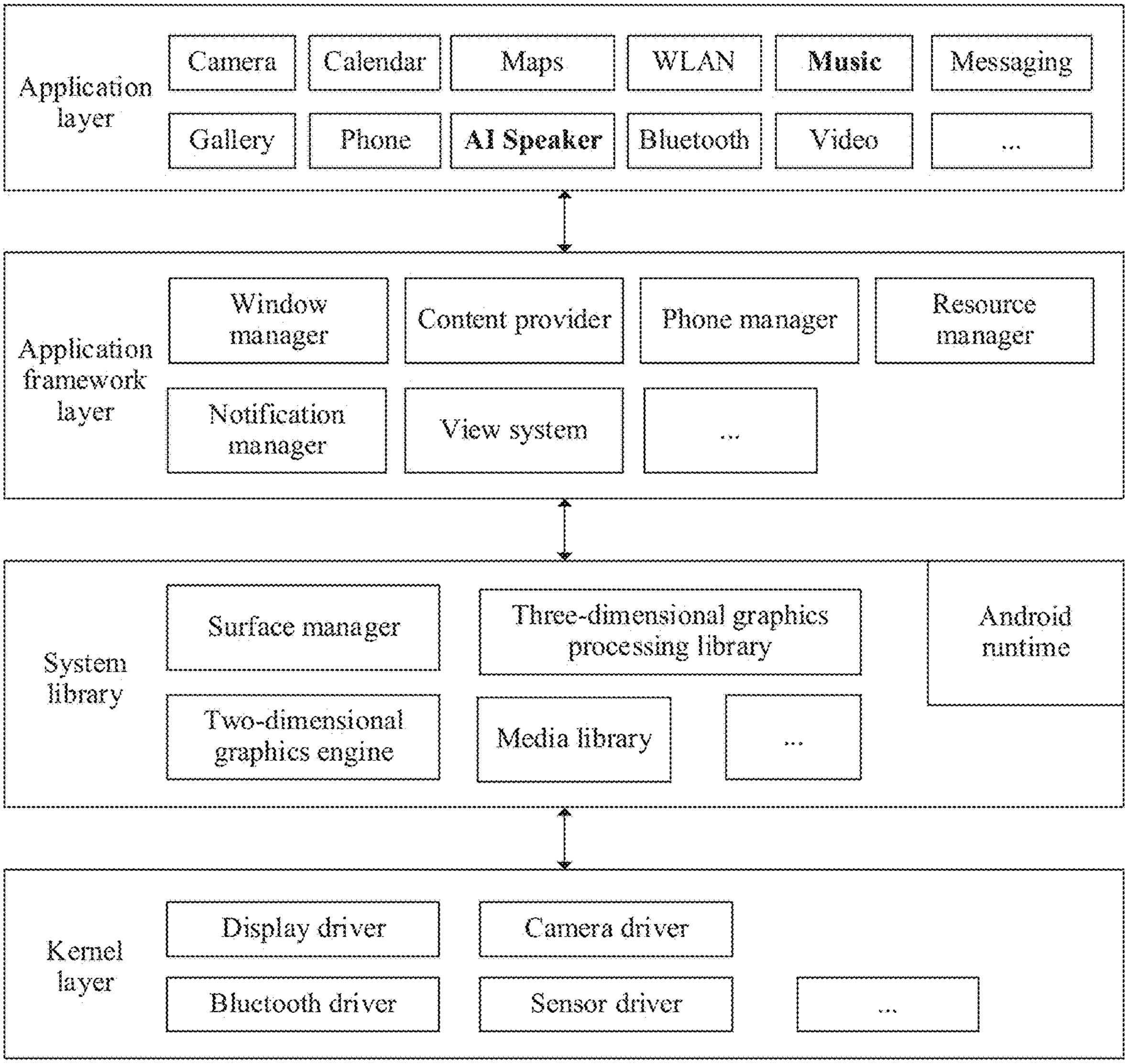
FIG. 12 is a schematic diagram of a software architecture of an electronic device 100 according to an embodiment of this application.

FIG. 12 shows an example of a software structure of an electronic device 100 according to an embodiment of this application.

As shown in FIG. 12, a software system of the electronic device 100 may use a layered architecture, an event-driven architecture, a microkernel architecture, a micro service architecture, or a cloud architecture. In an embodiment of this application, an Android system of a layered architecture is used as an example to describe a software structure of the electronic device 100.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 12, the application packages may include applications such as “Camera”, “Gallery”, “Calendar”, “Phone”, “Maps”, “AI Speaker”, “WLAN”, “Bluetooth”, “Music”, “Video”, and “Messaging”.

An AI speaker application may implement a plurality of functions, for example, may be configured to manage or be bound to one or more smart speakers that establish a connection to the electronic device 100, and may be further configured to play music, control another smart home device, and the like.

A music application (for example, “Huawei Music”) may be used by a user to play music.

In some embodiments, the music application and the AI speaker application may be a same application, and may not only be configured to play music, but may also be configured to be bound to a smart home device such as a speaker.

It should be noted that a name of the music application and a name of the AI speaker application are merely words used in embodiments of this application, meanings represented by the words have been described in embodiments of this application, and the names of the music application and the AI speaker application cannot constitute any limitation on embodiments of this application.

The application framework layer provides an application programming interface (application programming interface, API) and a programming framework for an application at the application layer. The application framework layer includes some predefined functions.

As shown in FIG. 12, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be configured to construct an application. A display interface may include one or more views. For example, a display interface including an SMS message notification icon may include a view for displaying a text and a view for displaying a picture.

The telephone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in the status bar, and may be configured to convey a notification message. The displayed notification information may automatically disappear after a short stay without user interaction. For example, the notification manager is configured to notify download completion, provide a message notification, and the like. The notification manager may alternatively be a notification that appears in a top status bar of the system in a form of a graph or a scroll bar text, for example, a notification of an application running on a background or a notification that appears on a screen in a form of a dialog window. For example, text information is prompted in the status bar, an alert sound is played, the electronic device vibrates, or an indicator light blinks.

The Android runtime includes a core library and a virtual machine. The Android runtime is responsible for scheduling and management of the Android system The core library includes two parts: a function that needs to be invoked in a Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and abnormality management, and garbage collection.

The system library may include a plurality of functional modules, for example, a surface manager (surface manager), a media library (media Library), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, a Bluetooth driver, and a sensor driver.

The following describes an example of a working procedure of software and hardware of the electronic device 100 with reference to a capturing/photographing scenario.

When a touch sensor 180K receives a touch operation, a corresponding hardware interrupt is sent to the kernel layer. The kernel layer processes the touch operation into an original input event (including information such as touch coordinates and a time stamp of the touch operation). The original input event is stored in the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface at the application framework layer, to start the camera application, then starts the camera driver by invoking the kernel layer, and captures a static image or a video by using the camera 193.

The following describes a structure of an electronic device 200 according to an embodiment of this application.

Figure 13:
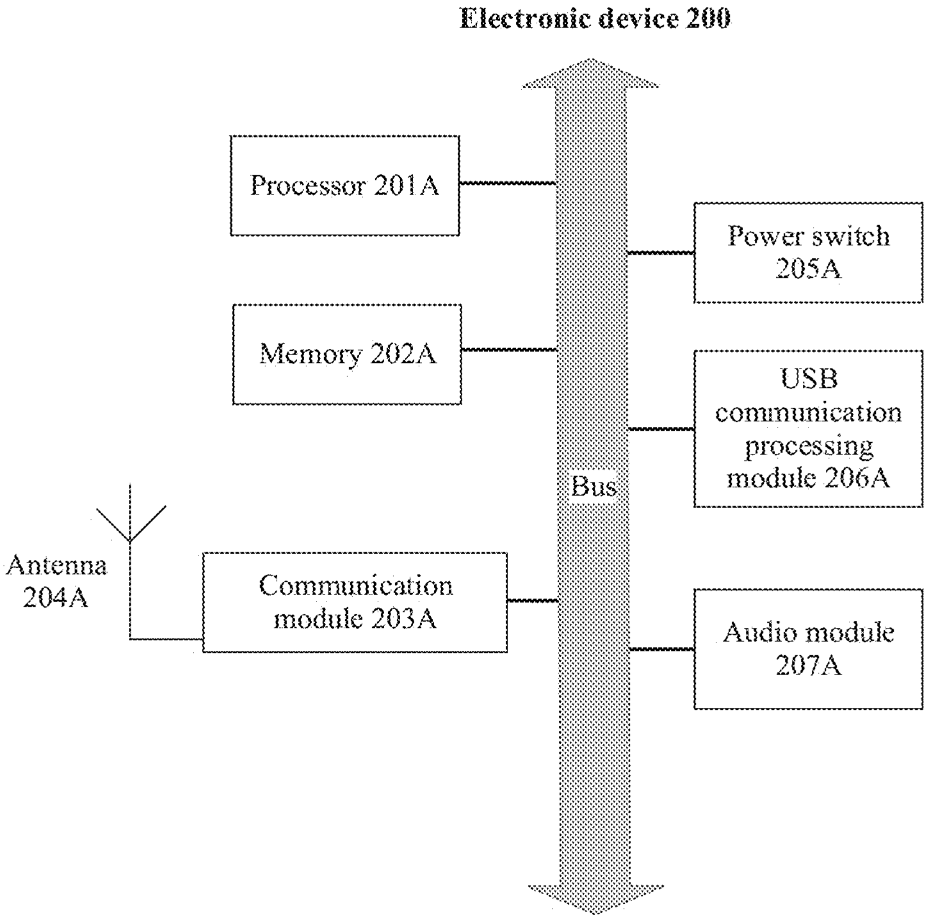
FIG. 13 is a schematic diagram of a structure of an electronic device 200 according to an embodiment of this application.

FIG. 13 shows an example of a structure of an electronic device 200 according to an embodiment of this application. The electronic device 200 may be a smart speaker.

As shown in FIG. 13, the electronic device 200 may include a processor 201A, a memory 202A, a communication module 203A, an antenna 204A, a power switch 205A, a USB communication processing module 206A, and an audio module 207A.

The processor 201A may be configured to read and execute computer-readable instructions. In a specific implementation, the processor 201A may mainly include a controller, an arithmetic unit, and a register. The controller is mainly responsible for decoding instructions and sending a control signal for an operation corresponding to the instructions. The arithmetic logical unit is mainly responsible for storing a register operand, an intermediate operation result, and the like that are temporarily stored during instruction execution. In a specific implementation, a hardware architecture of the processor 201A may be an application-specific integrated circuit (ASIC) architecture, an MIPS architecture, an ARM architecture, an NP architecture, or the like.

In some embodiments, the processor 201A may be configured to parse a signal received by the communication module 203A. The processor 201A may be configured to perform a processing operation based on a parsing result.

The memory 202A is coupled to the processor 201A, and is configured to store various software programs and/or a plurality of groups of instructions. In a specific implementation, the memory 202A may include a high-speed random access memory, and may also include a nonvolatile memory, such as one or more magnetic disk storage devices, a flash memory device, or another nonvolatile solid-state storage device. The memory 202A may store an operating system, for example, an embedded operating system such as uCOS, VxWorks, or RTLinux. The memory 202A may further store a communication program, and the communication program may be used to communicate with an electronic device 100, a server 300, or another device.

The communication module 203A may provide a solution, applied to the electronic device 200, to wireless communication including a WLAN (such as a Wi-Fi network), BLE, GNSS, FM, and the like. In some embodiments, the communication module 203 A may listen to a signal transmitted by another device (for example, the electronic device 100), for example, a probe request, may send a response signal and the like, so that the another device (for example, the electronic device 100) may discover the electronic device 200, and may communicate with the another device (for example, the electronic device 100) through Wi-Fi.

In some other embodiments, the communication module 203A may also transmit a signal, so that the another device (for example, the electronic device 100) may discover the electronic device 200, and may communicate with the another device (for example, the electronic device 100) through Bluetooth or Wi-Fi.

A wireless communication function of the electronic device 200 may be implemented by using the antenna 204A, the communication module 203A, a modem processor, and the like.

The antenna 204A may be configured to transmit and receive an electromagnetic wave signal. Each antenna in the electronic device 200 may be configured to cover one or more communication frequency bands.

In some embodiments, the communication module 203A may include one or more antennas.

The power switch 205A may be configured to control a power supply to supply power to the electronic device 200.

The USB communication processing module 206A may be configured to communicate with another device through a USB interface (not shown in the figure).

The audio module 207A may be configured to output an audio signal through an audio output interface. The audio module may be further configured to receive audio data through an audio input interface. The electronic device 200 may be a media device such as a smart speaker.

In addition to the smart speaker, in some embodiments, the electronic device 200 may alternatively be a smart television (which may also be referred to as a smart screen) or the like. In this case, the electronic device 200 may further include a display (not shown), where the display may be configured to display an image, prompt information, and the like. The display may be a liquid crystal display (liquid crystal display, LCD), an organic light-emitting diode (organic light-emitting diode, OLED) display, an active-matrix organic light emitting diode (active-matrix organic light emitting diode, AMOLED) display, a flexible light-emitting diode (flexible light-emitting diode, FLED) display, a quantum dot emitting diode (quantum dot emitting diode, QLED) display, or the like.

It may be understood that the electronic device 200 shown in FIG. 13 is merely an example, and the structure shown in FIG. 13 does not constitute a specific limitation on the electronic device 200. In some other embodiments of this application, the electronic device 200 may have more or fewer components than those shown in FIG. 13, may combine two or more components, or may have different component configurations. Various components shown in the figure may be implemented in hardware including one or more signal processing and/or application-specific integrated circuits, software, or a combination of hardware and software.

The following describes a structure of a server 300 according to an embodiment of this application.

Figure 14:
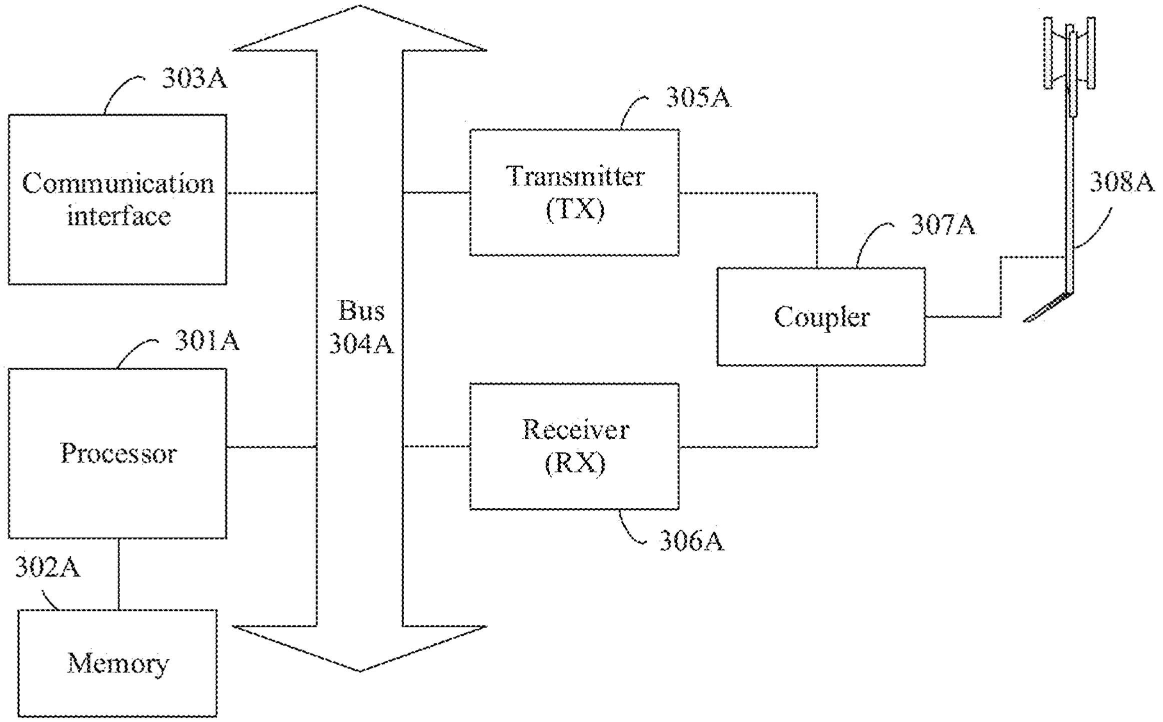
FIG. 14 is a schematic diagram of a structure of a server 300 according to an embodiment of this application.

FIG. 14 shows an example of a structure of a server 300 according to an embodiment of this application.

As shown in FIG. 14, the server 300 may include one or more processors 301A, a memory 302A, a communication interface 303A, a transmitter 305A, a receiver 306A, a coupler 307A, and an antenna 308A. These components may be connected by using a bus 304A or in another manner. In FIG. 14, an example in which the components are connected by using the bus is used.

The communication interface 303A may be used by the server 300 to communicate with another communication device, for example, an electronic device 100 or an electronic device 200. Specifically, the communication interface 303A may be a 3G communication interface, a 4G communication interface, a 5G communication interface, a future new radio communication interface, or the like. In addition to the wireless communication interface, the server 300 may further be configured with a wired communication interface 303A, for example, a local access network (local access network, LAN) interface. The transmitter 305A may be configured to perform transmission processing on a signal output by the processor 301A. The receiver 306A may be configured to perform reception processing on a mobile communication signal received by the antenna 308A.

In some embodiments of this application, the transmitter 305A and the receiver 306A may be considered as a wireless modem. In the server 300, there may be one or more transmitters 305A and receivers 306A. The antenna 308A may be configured to convert electromagnetic energy in a transmission line into an electromagnetic wave in free space, or convert the electromagnetic wave in the free space into the electromagnetic energy in the transmission line. The coupler 307A is configured to divide the mobile communication signal received by the antenna 308A into a plurality of signals and allocate the plurality of signals to a plurality of receivers 306A.

The memory 302A is coupled to the processor 301A, and is configured to store various software programs and/or a plurality of groups of instructions. Specifically, the memory 302A may include a high-speed random access memory, and may also include a nonvolatile memory, such as one or more magnetic disk storage devices, a flash memory device, or another nonvolatile solid-state storage device. The memory 302A may store a network communication program, and the network communication program may be used to communicate with one or more additional devices, one or more terminal devices, and one or more network devices.

In some embodiments of this application, the memory 302A may be configured to store a program for implementing, on a server 300 side, a play record display method provided in one or more embodiments of this application. For implementation of the play record display method provided in one or more embodiments of this application, refer to the foregoing embodiments.

The processor 301A may be configured to read and execute computer-readable instructions. Specifically, the processor 301A may be configured to invoke a program stored in the memory 302A, for example, the program for implementing, on the server 300 side, the play record display method provided in one or more embodiments of this application, and execute instructions included in the program.

It should be noted that the server 300 shown in FIG. 14 is merely an implementation in embodiments of this application. In actual application, the server 300 may alternatively include more or fewer components. This is not limited herein.

For more details about functions and working principles of the server 300, refer to related content in the foregoing embodiments. Details are not described herein again.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, that integrates one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art may understand that all or some of the procedures of the methods in embodiments may be implemented by a computer program instructing related hardware. The program may be stored in a computer-readable storage medium. When the program is executed, the procedures in the foregoing method embodiments may be performed. The foregoing storage medium includes any medium that may store program code, such as a ROM, a random access memory RAM, a magnetic disk, or an optical disc.

The foregoing embodiments are merely intended for describing the technical solutions of this application, rather than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. A method, comprising:

displaying, by a first electronic device associated with an account, a first historical play record of the account, wherein the first historical play record does not comprise a first song;

receiving, by the first electronic device and from a server, a message; and displaying, by the first electronic device and based on the message, a second historical play record comprising the first song to indicate that a second electronic device associated with the account played the first song when a distance between the first electronic device and the second electronic device was less than or equal to a first preset threshold.

2. The method of claim 1, further comprising displaying, by the first electronic device, a third historical play record, wherein the third historical play record does not comprise a second song, and indicates that the second song was a song played by the second electronic device when the distance was greater than the first preset threshold.

3. The method of claim 1, wherein the first electronic device is configured to:

periodically send first location information to the server; and send first reference location information of the first electronic device to the server when the second electronic device is associated with the first account, wherein the distance being less than or equal to the first preset threshold is obtained when location information is the same as first reference location information.

4. The method of claim 1, wherein before receiving, by the first electronic device, the message, the method further comprises:

detecting, by the first electronic device based on a short-range communication connection, that one or more electronic devices associated with the account exist in a same network, wherein the one or more electronic devices comprise the second electronic device; and obtaining device information of the one or more electronic devices.

5. The method of claim 1, wherein an average difference between the first song and a song in the first historical play record is less than or equal to a second preset threshold.

6. The method of claim 5, further comprising calculating, by the server, the average difference between the first song and the song in the first historical play record using the following formula:

$$Dist = \frac{\sqrt{\sum_{i=1}^{N} D_i^2}}{N},$$

wherein Dist is the average distance, wherein $D_i$ is a difference between the first song and an $i^{th}$ song in the first historical play record, and wherein N is a quantity of songs in the first historical play record.

7. The method of claim 6, further comprising:

determining, by the server and based on song category information, that a first category of the first song is the same as a second category of the $i^{th}$ song in the first historical play record; and calculating $D_i$ using the following formula:

$$D_i = \sqrt{(x_1 - x_0)^2 + (y_1 - y_0)^2 + (z_1 - z_0)^2},$$

wherein $D_i$ is the difference between the first song and the $i^{th}$ song in the first historical play record, wherein N is a quantity of songs in the first historical play record, wherein $x_1$, $y_1$, and $z_1$ are respectively a first rhythm value of the first song, a first age value of the first song, and a first sadness/joy degree value of the first song, and wherein $x_0$, $y_0$, and $z_0$ are respectively a second rhythm value of the $i^{th}$ song in the first historical play record, a second age value of the $i^{th}$ song, and a second sadness/joy degree value of the $i^{th}$ song; or when the server determines, based on the song category information, that a first category of the first song is different from a second category of the $i^{th}$ song in the first historical play record, $D_i$ is a preset fixed value.

8. The method of claim 1, wherein the message comprises information about the first song.

9. The method of claim 1, wherein after displaying, by the first electronic device, thea second historical play record, the method further comprises displaying, by the first electronic device, a song recommendation list, wherein the song recommendation list comprises one or more songs of a same category as the first song.

10. The method of claim 1, wherein before receiving, by the first electronic device, the message, the method further comprises:

detecting, by the first electronic device, an operation that a user binds the second electronic device;

obtaining, by the first electronic device and in response to the operation, device information of the second electronic device; and sending, by the first electronic device and to the server, the account, device information of the first electronic device, and the device information of the second electronic device.

11. The method of claim 10, wherein after detecting, by the first electronic device, the operation, the method further comprises: sending, by the first electronic device, location information of the first electronic device to the server when the first electronic device enables location service permission.

12. A first electronic device, comprising:

one or more memories configured to store programming instructions; and one or more processors coupled to the one or more memories and configured to execute the programming instructions to cause the first electronic device to:

display a first historical play record of an account, wherein the first historical play record does not comprise a first song;

receive, from a server, a message; and display, based on the message, a second historical play record comprising the first song to indicate that a second electronic device associated with the account played the first song when a distance between the first electronic device and the second electronic device was less than or equal to a first preset threshold.

13. A computer program product comprising computer-executable instructions that are stored on a non-transitory computer-readable medium and that, when executed by one or more processors, cause an apparatus to:

display, by a first electronic device, a first historical play record of an account, wherein the first historical play record does not comprise a first song;

receive, by the first electronic device and from a server, a message; and display, based on the message, a second historical play record comprising the first song to indicate that a second electronic device associated with the account played the first song when a distance between the first electronic device and the second electronic device was less than or equal to a first preset threshold.

14. The first electronic device of claim 12, wherein the one or more processors are further configured to execute the programming instructions to cause the first electronic device to:

display a third historical play record, wherein the third historical play record does not comprise a second song, and wherein the second song is a song played by the second electronic device when the distance is greater than the first preset threshold.

15. The first electronic device of claim 12, wherein an average difference between the first song and a song in the first historical play record is less than or equal to a second preset threshold.

16. The first electronic device of claim 12, wherein the one or more processors are further configured to execute the programming instructions to cause the first electronic device to:

periodically send first location information to the server; and send first reference location information of the first electronic device to the server when the second electronic device is associated with the account, wherein the distance being less than or equal to the first preset threshold is obtained when first location information is the same as first reference location information.

17. The first electronic device of claim 12, wherein before receiving the message, the one or more processors are further configured to execute the programming instructions to cause the first electronic device to:

detect, based on a short-range communication connection, that one or more electronic devices associated with the account exist in a same network; and obtain device information of the one or more electronic devices, wherein the device information of the one or more electronic devices comprises device information of the second electronic device.

18. The computer program product of claim 13, wherein the one or more processors are further configured to execute the computer-executable instructions to cause the apparatus to:

display, by the first electronic device, a third historical play record, wherein the third historical play record does not comprise a second song, and wherein the second song is a song played by the second electronic device when the distance is greater than the first preset threshold.

19. The computer program product of claim 13, wherein the one or more processors are further configured to execute the computer-executable instructions to cause the apparatus to:

periodically send first location information to the server; and send first reference location information of the first electronic device to the server when the second electronic device is associated with the account, wherein the distance being less than or equal to the first preset threshold is obtained when first location information is the same as first reference location information.

20. The computer program product of claim 13, wherein an average difference between the first song and a song in the first historical play record is less than or equal to a second preset threshold.

* * * * *